US012366819B2

(12) United States Patent
Takayama et al.

(10) Patent No.: US 12,366,819 B2
(45) Date of Patent: Jul. 22, 2025

(54) IMAGE FORMING APPARATUS

(71) Applicant: CANON KABUSHIKI KAISHA, Tokyo (JP)

(72) Inventors: Toshihiko Takayama, Kanagawa (JP); Shinsuke Kobayashi, Kanagawa (JP); Shuichi Tetsuno, Kanagawa (JP); Shimpei Ishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/439,604

(22) Filed: Feb. 12, 2024

(65) Prior Publication Data

US 2024/0288812 A1 Aug. 29, 2024

(30) Foreign Application Priority Data

Feb. 27, 2023 (JP) ................................ 2023-027944

(51) Int. Cl.
*G03G 15/00* (2006.01)
*G03G 15/02* (2006.01)
(Continued)

(52) U.S. Cl.
CPC ..... *G03G 15/5008* (2013.01); *G03G 15/0233* (2013.01); *G03G 15/6502* (2013.01);
(Continued)

(58) Field of Classification Search
CPC ........... G03G 15/5008; G03G 15/0233; G03G 15/6502; G03G 15/6529; G03G 15/757; G03G 21/02; G03G 21/1633; G03G 21/206; G03G 2215/0614; G03G 21/0005; G03G 2221/0042
See application file for complete search history.

(56) References Cited

U.S. PATENT DOCUMENTS

2009/0003869 A1* 1/2009 Takahashi .......... G03G 21/1633 399/75
2010/0196040 A1* 8/2010 Shimizu ............. G03G 21/0005 399/71
2021/0382430 A1* 12/2021 Funatani ............ G03G 15/0233

FOREIGN PATENT DOCUMENTS

JP 2010030080 A 2/2010
JP 2011034063 A 2/2011
(Continued)

*Primary Examiner* — Sandra Brase
(74) *Attorney, Agent, or Firm* — Canon U.S.A., Inc. IP Division

(57) ABSTRACT

An image forming apparatus to perform an image forming operation for forming an image on a transfer material includes a photosensitive drum, a moving member, a detection unit, and a control unit. The detection unit detect information about a first movement in which the moving member moves from an open position to a shielding position or a second movement in which the moving member moves from the shielding position to the open position. During execution of a non-image forming operation, the control unit executes a multiple switching operation for performing a switching operation a plurality of times. The switching operation is an operation in which the control unit stops the photosensitive drum from being driven and then rotatably re-drives the photosensitive drum. Where the detection unit detects the information about the first movement or the second movement, the control unit performs control to execute the multiple switching operation.

32 Claims, 21 Drawing Sheets

(51) Int. Cl.
*G03G 21/02* (2006.01)
*G03G 21/16* (2006.01)
*G03G 21/20* (2006.01)

(52) U.S. Cl.
CPC ....... *G03G 15/6529* (2013.01); *G03G 15/757* (2013.01); *G03G 21/02* (2013.01); *G03G 21/1633* (2013.01); *G03G 21/206* (2013.01); *G03G 2215/0614* (2013.01)

(56) References Cited

FOREIGN PATENT DOCUMENTS

| | | | |
|---|---|---|---|
| JP | 2013057752 | A | 3/2013 |
| JP | 2016110052 | A | 6/2016 |

* cited by examiner

IMAGE FORMING APPARATUS

BACKGROUND

Field

The present disclosure relates to an image forming apparatus using an electrophotographic recording method, such as a laser beam printer, copying machine, and facsimile.

Description of the Related Art

An image forming apparatus using an electrophotographic method uniformly charges a photosensitive drum as an image bearing member and then exposes the photosensitive drum to light according to an image pattern to form an electrostatic latent image on the photosensitive drum. Then, the image forming apparatus develops the electrostatic latent image on the photosensitive drum by using a toner to visualize the image, and transfers the image onto a recording material such as paper. For example, Japanese Patent Application Laid-Open No. 2016-110052 discloses an image forming apparatus includes a contact type charging roller having a shaft core, an elastic layer, and a surface layer on the outer circumference of the elastic layer.

As a method for collecting residual transfer toner remaining on a conventional photosensitive drum, a cleaner-less method (a method in which cleaning is performed concurrently with development) is known in which the residual toner is collected by a development apparatus at a developing portion and then reused. There are some image forming apparatuses that employ a known cleaner-less configuration in which, in a case of using a charge roller as a charging unit for a photosensitive drum, a speed difference (hereinafter referred to as a circumferential speed difference) is made between the surface speeds of the photosensitive drum and the charge roller in order to prevent a charging failure caused by an excessive toner adhering to the charge roller.

However, the in the above known cleaner-less configuration, if foreign substances enter an image forming apparatus, an image defect may be caused by the foreign substances since a collection member for collecting the foreign substances is not provided.

Particularly, in an environment where foreign substances, such as dust, are easily stirred up by a wind around the image forming apparatus, foreign substances stirred up by a wind from an air conditioner or ambient air may enter the image forming apparatus. If some of the foreign substances that have entered the image forming apparatus fall on a photosensitive drum, for example, by a vibration caused by the opening and closing of a door of the apparatus, this may cause an image defect.

SUMMARY

The present disclosure is directed to preventing an image defect that is caused by foreign substances adhering to a photosensitive drum.

According to an aspect of the present disclosure, an image forming apparatus capable of performing an image forming operation for forming an image on a transfer material, the image forming apparatus includes a photosensitive drum that is rotatable, a charging member configured to come into contact with the photosensitive drum to form a charging portion and charge a surface of the photosensitive drum at the charging portion, a developing member configured to supply a toner to the surface of the photosensitive drum charged by the charging member, a transfer member configured to come into contact with the photosensitive drum to form a transfer portion and transfer the toner formed on the photosensitive drum to the transfer material at the transfer portion, a moving member configured to move between an open position where an inside of the image forming apparatus is exposed and a shielding position where the inside of the image forming apparatus is shielded, a detection unit configured to detect information about a first movement in which the moving member moves from the open position to the shielding position or a second movement in which the moving member moves from the shielding position to the open position, a drive source configured to rotatably drive the photosensitive drum, and a control unit configured to control the drive source, wherein, during execution of a non-image forming operation different from the image forming operation, the control unit performs control to execute a multiple switching operation for performing a switching operation a plurality of times, wherein the switching operation is an operation in which the control unit stops the photosensitive drum in a state of being driven and then rotatably re-drives the photosensitive drum, and wherein, in a case where the detection unit detects the information about the first movement or the second movement, the control unit performs control to execute the multiple switching operation.

Further features of the present disclosure will become apparent from the following description of exemplary embodiments with reference to the attached drawings.

DESCRIPTION OF THE EMBODIMENTS

Some modes for embodying the present disclosure will be illustratively described in detail below based on exemplary embodiments with reference to the accompanying drawings. However, sizes, materials, shapes, and relative arrangements of elements described in the exemplary embodiments are not limited thereto and are to be modified as required depending on the configuration of an apparatus to which the present disclosure is applied and other various conditions. The scope of the present disclosure is not limited to the exemplary embodiments described below.

1. Image Forming Apparatus

Figure 1:
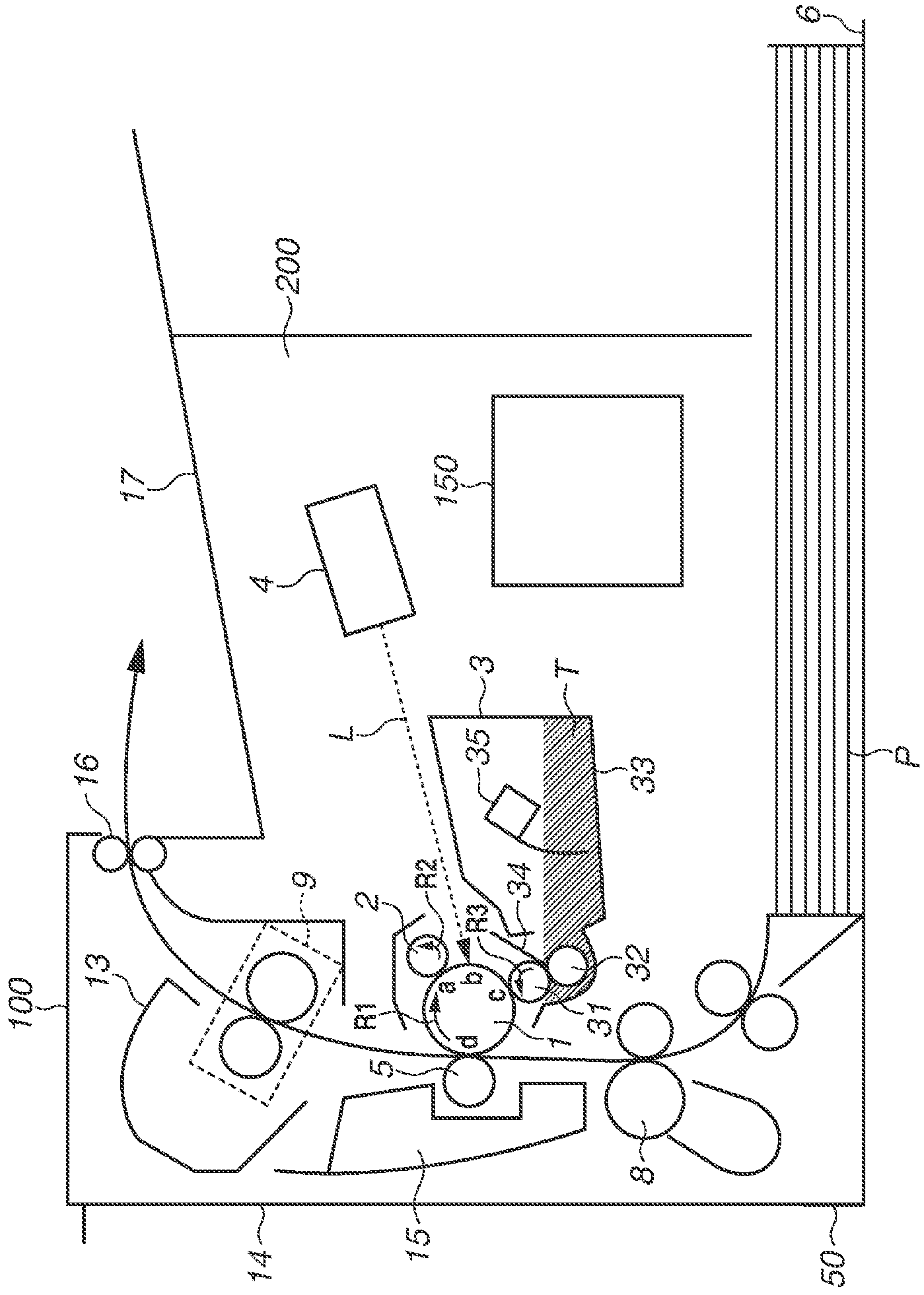
FIG. 1 is a cross-sectional diagram schematically illustrating an image forming apparatus according to a first exemplary embodiment.

FIG. 1 is a diagram schematically illustrating a configuration of an image forming apparatus 100 according to a first exemplary embodiment of the present disclosure.

Figure 4:
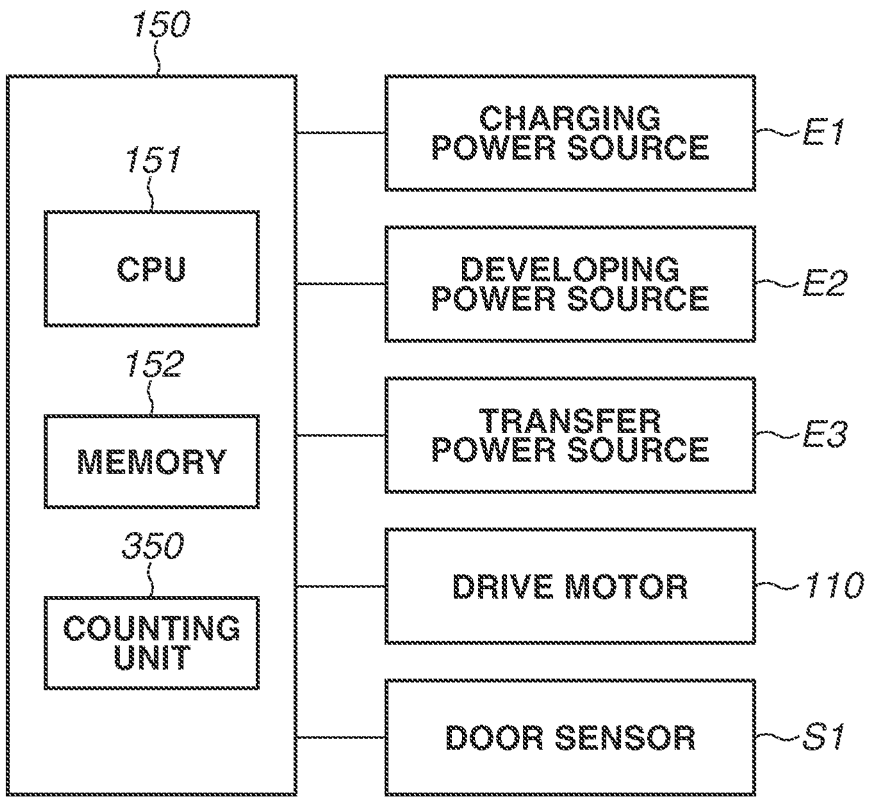
FIG. 4 is a control block diagram illustrating control blocks of the image forming apparatus according to the first exemplary embodiment.

The image forming apparatus 100 according to the present exemplary embodiment is a monochromatic laser beam printer employing a cleaner-less method and a contact charging method. The image forming apparatus 100 includes an inlet plate 50 as a holding member for holding a power inlet (not illustrated). When the power inlet is plugged into the inlet plate 50, power is supplied to an apparatus main body 200. The image forming apparatus 100 includes a photosensitive drum 1 that is an electrophotographic photosensitive member having a drum shape (cylindrical shape) and serving as a rotatable image bearing member. When an image output operation is started, the photosensitive drum 1 is rotatably driven in the direction of the arrow R1 (clockwise direction) by a drive motor 110 (FIG. 4).

The surface of the rotating photosensitive drum 1 is uniformly charged to a predetermined potential having the normal polarity (negative polarity according to the present exemplary embodiment) by a charge roller 2 in the vicinity of a charging portion a where the photosensitive drum 1 and the charge roller 2 come into contact with each other. The charge roller 2 is a roller-type charging member as a charging unit. More particularly, the charge roller 2 charges the surface of the photosensitive drum 1 by electric discharge occurring at least either one of small gaps between the charge roller 2 and the photosensitive drum 1 formed upstream and downstream of a contact portion therebetween in the rotational direction of the photosensitive drum 1. However, the following descriptions will be given on the assumption that the charging portion is the contact portion between the charge roller 2 and the photosensitive drum 1 in the rotational direction of the photosensitive drum 1.

The charge roller 2 is an elastic roller formed of a core metal and a conductive elastic layer around the core metal. The charge roller 2 is disposed in contact with the photosensitive drum 1, and is rotatably driven in the direction of the arrow R2 in FIG. 1 (counterclockwise direction). According to the present exemplary embodiment, the charge roller 2 is rotatably driven as described below. The charge roller 2 is applied with a predetermined charging voltage, which is a direct-current (DC) voltage having the negative polarity, by a charging power source E1 (FIG. 4) as a charging voltage application unit. According to the present exemplary embodiment, the charge roller 2 is applied with a DC voltage having the negative polarity as the charging voltage during charge processing. According to the present exemplary embodiment, the charging voltage is set to, for example, −1,200 V. Thus, according to the present exemplary embodiment, the surface of the photosensitive drum 1 is uniformly charged to a dark potential Vd of −600 V.

The uniformly charged surface of the photosensitive drum 1 is subjected to scanning exposure by a laser beam L modulated based on image data by an exposure apparatus (laser exposure unit) 4 as an exposure unit (electrostatic image forming unit). The exposure apparatus 4 repeats exposure in the main scanning direction (rotational axis direction) of the photosensitive drum 1 and at the same time performs exposure in the sub scanning direction (surface movement direction) by using the laser beam L to form an electrostatic latent image on the photosensitive drum 1. According to the present exemplary embodiment, when the surface of the photosensitive drum 1 is exposed by the exposure apparatus 4, the absolute value of the dark potential Vd on the uniformly charged surface of the photosensitive drum 1 decreases, and the dark potential Vd becomes a bright potential Vl of −100 V. The exposure position on the photosensitive drum 1 subjected to exposure by the exposure apparatus 4 in the rotational direction of the photosensitive drum 1 is an image exposure portion b. The exposure apparatus 4 is not limited to a laser scanner apparatus but may be, for example, a light emitting diode (LED) array having a plurality of LEDs arranged along the longitudinal direction of the photosensitive drum 1.

An electrostatic latent image formed on the photosensitive drum 1 is developed (visualized) into a toner image by a development apparatus 3 as a developing unit by using a toner T as a developer. As a toner serving as a developer according to the present exemplary embodiment, a spherical non-magnetic toner having an average particle diameter of 6.4 μm and an average circularity of 0.98 is used. According to the present exemplary embodiment, it is desirable to use a non-magnetic toner having a high average circularity. More specifically, an average circularity of 0.96 or higher is desirable.

The development apparatus 3 includes a developing roller 31 as a developer carrier and a developing member, a toner supply roller 32 as a developer supply unit, a developer storage chamber 33 for storing the toner, and a developing blade 34. The toner stored in the developer storage chamber 33 is stirred by a stirring member 35 and at the same time supplied onto the surface of the developing roller 31 by the toner supply roller 32. When the toner supplied onto the surface of the developing roller 31 passes through the contact portion between the developing roller 31 and the developing blade 34, the toner is uniformly thinned and negatively charged through abrasion charging. Although, in the present exemplary embodiment, a one-component non-magnetic contact development method is employed, the development method is not limited thereto. A two-component non-magnetic contact development method, a non-contact development method, or a magnetic development method may be used. Although, according to the present exemplary embodiment, the normal polarity of toner is the negative polarity, the normal polarity of toner is not limited to the negative polarity. The normal polarity of toner may be the positive polarity. In this case, the polarities of voltages in the following description may be changed to the opposite polarities as appropriate.

The developing roller 31 is rotatably driven in the counterclockwise direction indicated by the arrow R3 in FIG. 1 so that the moving direction of the surface of the photosensitive drum 1 coincides with the moving direction of the surface of the developing roller 31 at a developing portion c where the photosensitive drum 1 and the developing roller 31 come into contact with each other. The drive motor 110 as a drive unit for driving the developing roller 31 may be a main motor common to the drive motor 110 for the photosensitive drum 1. Alternatively, different drive motors may rotate the photosensitive drum 1 and the developing roller 31. In the development process, the developing roller 31 is applied with a predetermined developing voltage (developing bias) by a developing power source E2 (FIG. 4) as a developing voltage application unit. According to the present exemplary embodiment, the developing roller 31 is applied with a DC voltage having the negative polarity as the developing voltage. The developing voltage in the development process is set to −300 V. According to the present exemplary embodiment, a negatively charged toner having the same polarity as the charging polarity of the photosensitive drum 1 adheres to the exposure surface, which is an image forming portion on the photosensitive drum 1 where the absolute value of the potential has decreased when the photosensitive drum 1 is exposed after being uniformly charged. This developing method is referred to as a reversal development method.

According to the present exemplary embodiment, the developing roller 31 is configured to be constantly into contact with the photosensitive drum 1 at the developing portion c. However, the developing roller 31 and the photosensitive drum 1 may be configured to come into contact with each other and be separated from each other. In this case, a developing contact and separation mechanism may be separately provided. In the rotational operation as a pre-rotation process (described below), the photosensitive drum 1 may be rotated in a state where the developing roller 31 is separated from the photosensitive drum 1.

Figure 2:
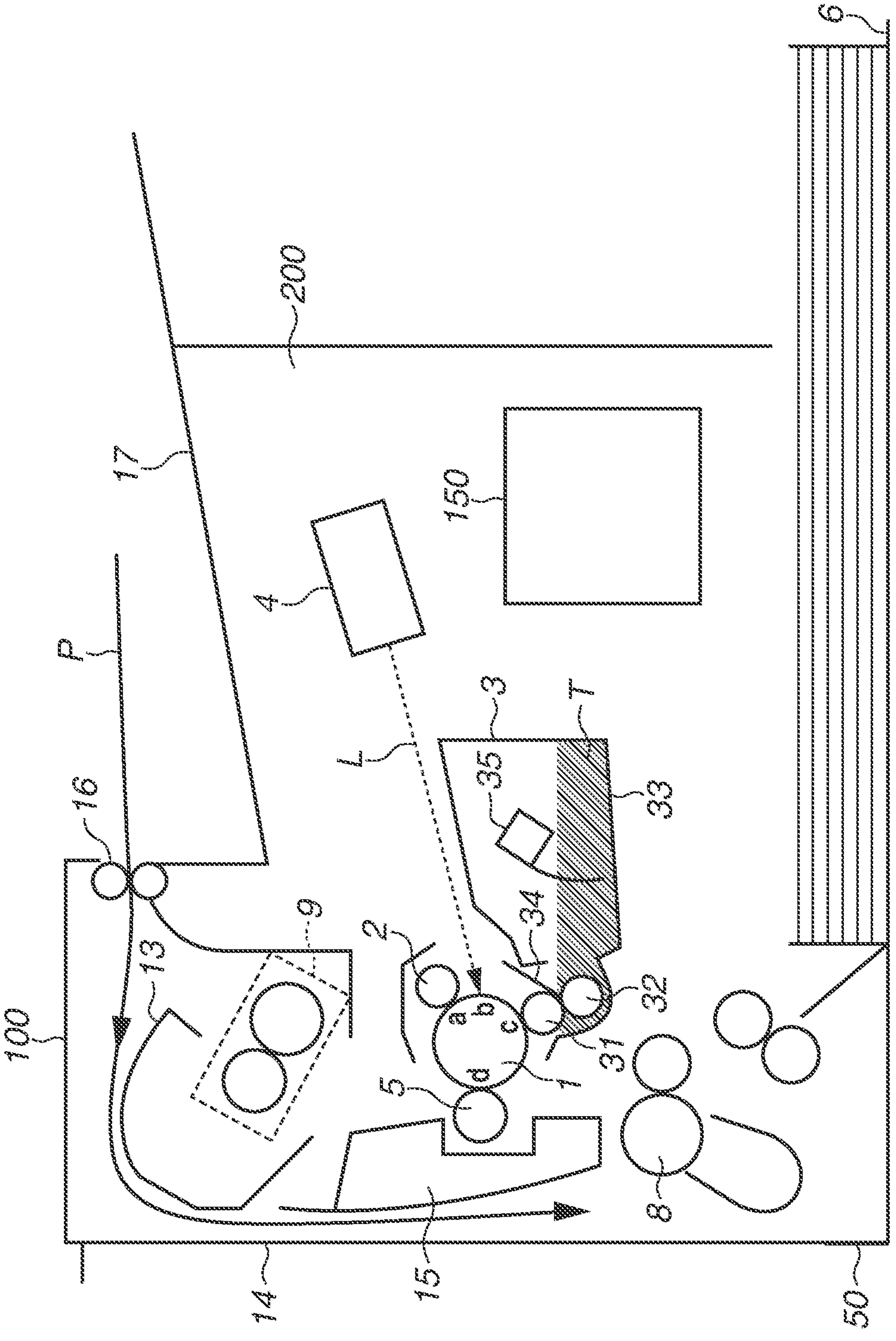
FIG. 2 is a diagram illustrating a recording material P being conveyed during double-sided printing according to the first exemplary embodiment.
Figure 3:
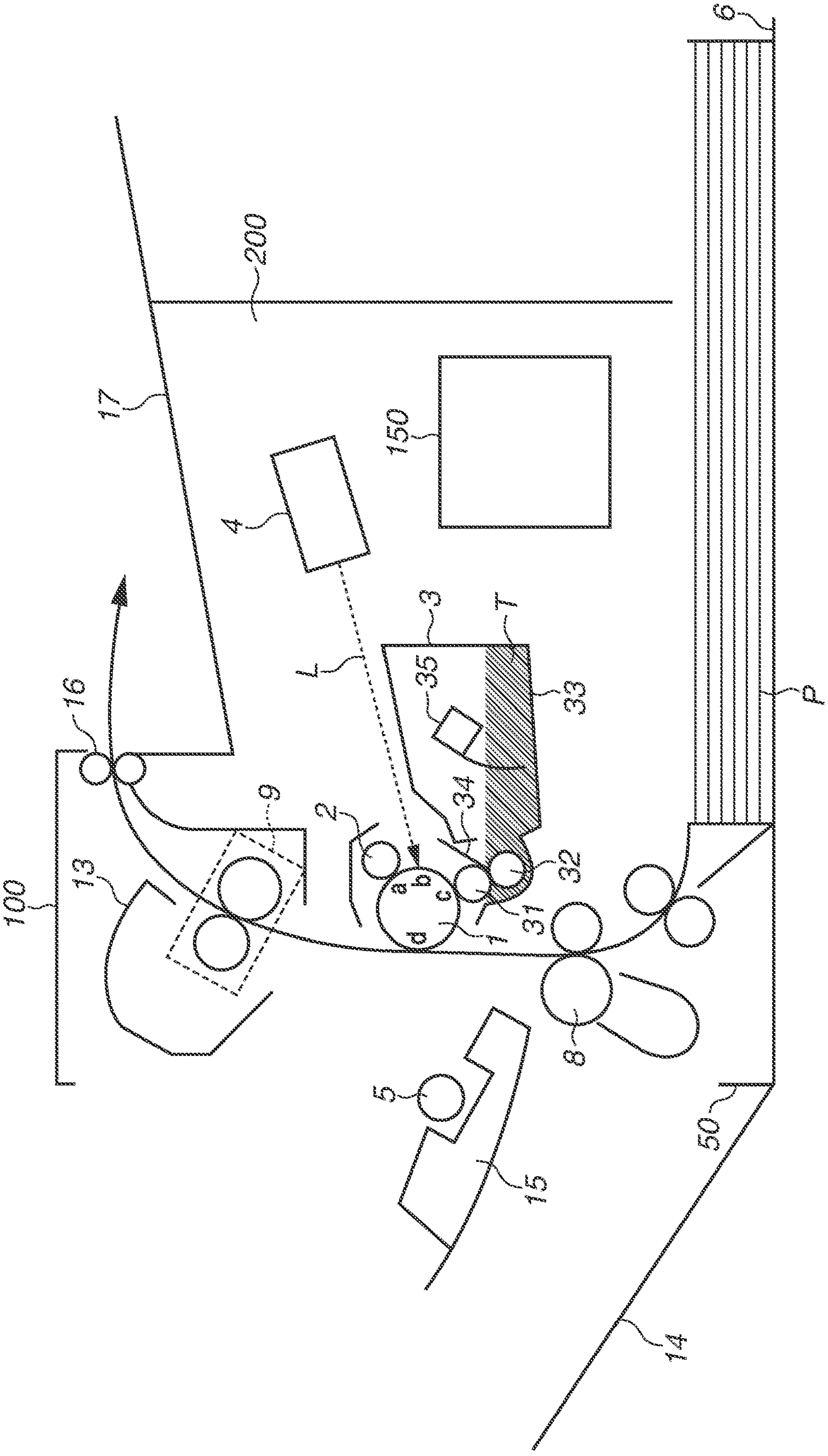
FIG. 3 is a diagram illustrating a state where a rear door and a transfer guide unit are opened according to the first exemplary embodiment.

The toner image formed on the photosensitive drum 1 is conveyed to a transfer portion d as a contact portion where the photosensitive drum 1 comes into contact with a transfer roller 5 that is roller-type transfer member serving as a transfer unit. According to the present exemplary embodiment, the transfer roller 5 is made of nitrile butadiene rubber (NBR)/hydrin-based conductive sponge rubber, having an outer diameter of 12 mm and a hardness of 30 degrees (Asker-C, 500 gf load). The transfer roller 5 is pressed with a predetermined pressure by the photosensitive drum 1. Meanwhile, in synchronization with the toner image on the photosensitive drum 1, a recording material P as a transfer material is conveyed to the transfer portion d from a storage portion 6 as a sheet feeding tray by a conveyance roller 8. Then, when the recording material P is conveyed to the transfer portion d while being held between the photosensitive drum 1 and the transfer roller 5, the toner image on the photosensitive drum 1 is transferred onto the recording material P by an action of the transfer roller 5. At this timing, the transfer roller 5 is applied with a predetermined transfer voltage, which is a DC voltage having the polarity opposite to the normal polarity of the toner (positive polarity according to the present exemplary embodiment), by a transfer power source E3 (FIG. 2). Thus, an electric field is formed between the transfer roller 5 and the photosensitive drum 1, and the toner image is electrostatically transferred from the photosensitive drum 1 to the recording material P. According to the present exemplary embodiment, the transfer voltage at this transfer timing is, for example, +1,000 V. Then, the toner image is electrostatically transferred from the photosensitive drum 1 to the recording material P by an action of the electric field formed between the transfer roller 5 and the photosensitive drum 1.

The recording material P with the toner image transferred thereon is conveyed to a fixing apparatus 9 as a fixing unit. In the fixing apparatus 9, the recording material P is applied with heat and pressure, and the toner image is fixed to the recording material P.

The recording material P with the toner image fixed thereon is discharged from a discharge port 16. In the single-sided printing mode, the recording material P is discharged onto a discharge tray 17. In the double-sided printing mode, the recording material P is switched back and then conveyed to a double-sided conveyance path, as illustrated in FIG. 2, before being discharged onto the discharge tray 17. In this case, the recording material P conveyed to the double-sided conveyance path is conveyed along a double-sided conveyance guide 13.

Meanwhile, the residual transfer toner remaining on the photosensitive drum 1 without being transferred to the recording material P is negatively charged again by electric discharge at the charging portion a. When the negatively charged residual transfer toner reaches the developing portion c with the rotation of the photosensitive drum 1, the residual toner is collected by the development apparatus 3.

According to the present exemplary embodiment, if the recording material P is stuck inside the apparatus main body 200 of the image forming apparatus 100, i.e., in a case where a paper jam occurs, during printing, the user can perform jam removal processing to remove the jammed recording material P from the inside of the apparatus main body 200 of the image forming apparatus 100. The apparatus main body 200 includes a rear door 14 as an opening/closing member that can be opened and closed to perform jam removal processing, and a transfer guide unit 15. According to the present exemplary embodiment, to stabilize the contact pressure between the transfer roller 5 and the photosensitive drum 1, the transfer guide unit 15 is provided with a spring (not illustrated) and configured to be applied with a force depending on the spring pressure of the spring in the closing direction of the transfer guide unit 15 when the transfer guide unit 15 is closed. The opening and closing of the transfer guide unit 15 is synchronized with the open and shielding positions at which the rear door 14 is opened and closed, which will be described below. According to the configuration of the present exemplary embodiment, if the recording material P is jammed between the conveyance roller 8 and the fixing apparatus 9, both the rear door 14 and the transfer guide unit 15 are moved from the shielding position to the open position to perform the jam removal processing. As illustrated in FIG. 2, if the recording material P is jammed in the double-sided conveyance path in the double-sided printing mode in which the recording material P is switched back before being discharged on the discharge tray 17, the user opens only the rear door 14 and move the rear door 14 from the shielding position to the open position. According to the present exemplary embodiment, the image forming apparatus 100 is provided with a door sensor S1 (FIG. 4) as an opening/closing detection unit for the rear door 14, and can detect whether the rear door 14 is open or closed. More specifically, the door sensor S1 can detect information about whether the rear door 14 is at the open position where the inside of the apparatus main body 200 of the image forming apparatus 100 is exposed or at the shielding position where at least of a part of the inside of the image forming apparatus 100 is shielded. More specifically, a control unit 150 detects the status of the rear door 14 based on the signal from the door sensor S1 for detecting the opening and closing of the rear door 14. When the user ends the jam removal processing, the user moves the rear door 14 from the open position to the shielding position to complete the jam removal processing. According to the exemplary embodiment, the rear door 14 and the transfer guide unit 15 can be independently opened and closed. However, the rear door 14 and the transfer guide unit 15 may be interlinked with each other by using a link mechanism to serve as an opening/closing member.

2. Photosensitive Drum and Charging Roller

The photosensitive drum 1 as an image bearing member is a photosensitive member having a cylindrical form. The photosensitive drum 1 according to the present exemplary embodiment includes a drum-shaped base member made of aluminum, and a photosensitive layer formed of a negatively charged organic photosensitive member on the base member. More specifically, the photosensitive drum 1 is a rigid body formed of an aluminum cylinder having a 24 mm diameter, coated with a resistive layer, an undercoat layer, and a photosensitive layer in this order on the outer circumferential surface thereof by using a dipping coating method. The photosensitive layer includes a charge generation layer and a charge transport layer. The charge transport layer has a thickness of 22 μm. The photosensitive drum 1 is rotatably driven by the drive motor 110 at a predetermined circumferential speed in the direction of the arrow R1 centering on the rotation axis. The circumferential speed of the photosensitive drum 1 defines the speed of the image forming by the image forming apparatus 100 and is also referred to as a process speed.

The process speed according to the present exemplary embodiment includes a process speed for the first mode and a process speed for the second mode that is higher than the process speed for the first mode. The circumferential speed of the photosensitive drum 1 corresponding to the process speed for the first mode is 93 milliseconds, and the circumferential speed of the photosensitive drum 1 corresponding to the process speed for the second mode is 140 milliseconds. In the present exemplary embodiment, the second mode is used as a regular mode, and the first is used as a low-speed mode. The low-speed mode refers to a mode in which a thick recording material P, such as gloss paper and thick paper, is fed. The low-speed mode includes the gloss mode and the thick paper mode in which fixing is performed at a high fixing temperature.

The charge roller 2 as a charging member comes into contact with the photosensitive drum 1 with a predetermined contact pressure to form the charging portion a. According to the present exemplary embodiment, the width of the contact nip formed between the charge roller 2 and the photosensitive drum 1 in the rotational direction is about 1 mm. When a charging voltage (direct-current (DC) voltage) is applied by the charging power source E1 as a charging voltage application circuit, the surface of the photosensitive drum 1 is uniformly charged to a predetermined potential. The charge roller 2 is formed of a core metal with a 5 mm diameter, a base layer made of hydrin rubber and a surface layer made of urethane, and has a 9.7 mm outer diameter. The charge roller 2 has a resistance of $1\times10^6\Omega$ or less and a hardness of 70 degrees measured with an MD-1 rubber hardness meter. Although, in the present exemplary embodiment, the charging voltage is a DC voltage, the charging voltage is not limited thereto. The charging voltage may be a DC voltage with an alternating-current (AC) voltage superimposed thereon.

3. Drive Configuration of Charge Roller

Figure 5:
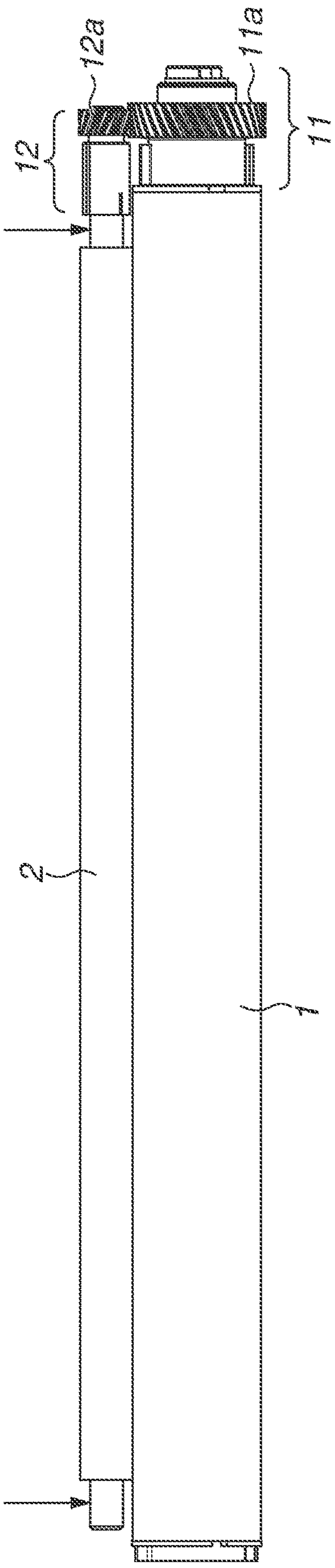
FIG. 5 is a diagram illustrating respective drive systems of a photosensitive drum and a charge roller according to the first exemplary embodiment.

The configuration of the rotation drive of the charge roller 2 according to the present exemplary embodiment will be described below with reference to FIGS. 5 and 6. FIG. 5 is a diagram illustrating the arrangement of the photosensitive drum 1, the charge roller 2, and gears 11*a* and 12*a* for transmitting a drive in the longitudinal direction. According to the present exemplary embodiment, a gear flange 11 is fixedly attached to an end of the photosensitive drum 1 in the longitudinal direction of the photosensitive drum 1, as illustrated in FIG. 5. In the longitudinal direction, the end where the gears 11*a* and 12*a* are disposed is referred to as a drive side, and the other end is referred to as a non-drive side. The drive from the drive motor (drive source) 110 is transmitted to an end of the gear flange 11, and the photosensitive drum 1 is thereby rotatably driven. As illustrated in FIG. 5, the gear portion (gears) 11*a* is formed in the gear flange 11 and is engaged with the gear portion (gears) 12*a* of a charge roller gear 12 press-fitted into an end of the core metal of the charge roller 2.

Figure 6:
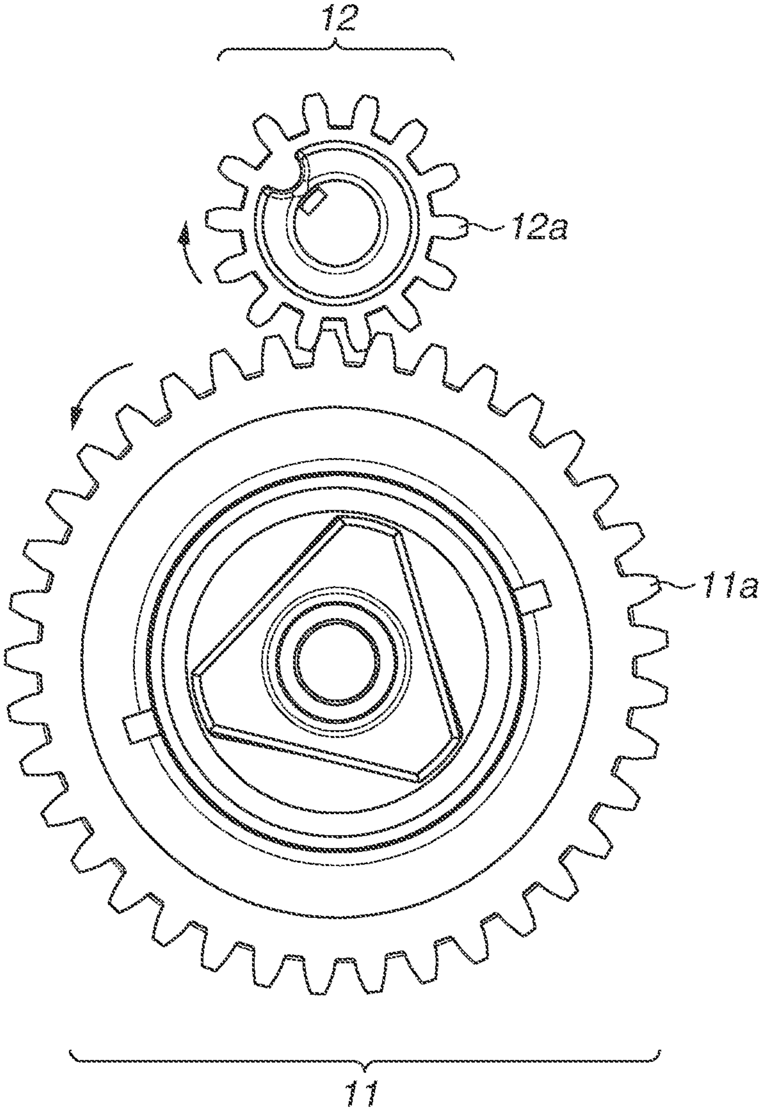
FIG. 6 is a diagram illustrating a gear drive train of the photosensitive drum and the charge roller according to the first exemplary embodiment.

According to the present exemplary embodiment, the gears 11*a* of the gear flange 11 of the photosensitive drum 1 have 37 teeth, and the gears 12 of the charge roller 2 have 14 teeth, as illustrated in FIG. 6. According to the present exemplary embodiment, based on the combination of the above-described numbers of gears and the outer diameters of the charge roller 2 and the photosensitive drum 1, the speed ratio of the surface speed of the charge roller 2 to the surface speed of the photosensitive drum 1 during the rotational driving (the surface speed of the charge roller 2/the surface speed of the photosensitive drum 1, hereinafter referred to as a circumferential speed ratio) is approximately 107%. By generating the speed difference between the charge roller 2 and the photosensitive drum 1 (at the charging portion a), it makes it easier to collect and return the toner adhering to the charge roller 2 to the photosensitive drum 1 by frictional charging. The surface speed of the charge roller 2 and the surface speed of the photosensitive drum 1, as used herein, are the surface moving speed of the charge roller 2 and the surface moving speed of the photosensitive drum 1, respectively.

These surface moving speeds may be interchangeably referred to as the rotational speed of the charge roller 2 and the rotational speed of the photosensitive drum 1.

According to the present exemplary embodiment, pressurization springs (not illustrated) for applying a pressure in a direction perpendicular to the surface of the photosensitive drum 1 are provided on the core metal portion via a bearing (not illustrated) at the positions indicated by the arrows in FIG. 5 on both ends of the charge roller 2. The pressing force on the side where the charge roller gear 12 is provided, i.e., the drive side, is 7.5 N, and the pressing force on the side opposite to the side where the charge roller gear 12 is provided, i.e., the non-drive side, is 5.6 N.

4. Image Output Operation

According to the present exemplary embodiment, the image forming apparatus 100 performs an image output operation (job) as a series of operations for forming an image on a single or a plurality of recording materials P according to a single start instruction from an external apparatus (not illustrated) such as a personal computer. A job generally includes an image forming process (print process), a pre-rotation process, a sheet interval process (in a case of forming images on a plurality of recording materials P), and a post-rotation process. In the following description, the term "a job" may be replaced with "a printing operation". For example, one job refers to a case where the image forming process is performed on one recording material P. The image forming process refers to a period during which an electrostatic image is formed on the photosensitive drum 1, the electrostatic image is developed (to form a toner image), the toner image is transferred and then fixed. The image formation period refers to this period. More particularly, the timings of the electrostatic image formation, the toner image formation, the toner image transfer and toner image fixing during the image formation period are different from each other depending on the positions on the photosensitive drum 1 where they are performed. Therefore, the image forming operation may be defined to include up to the toner image transfer or up to the toner image fixing. The image forming operation may be defined as described above because the image that has already been transferred onto the recording material P is not affected at all even if the operation of the photosensitive drum 1 is changed from the image forming operation to the non-image forming operation after completion of the image forming operation performed on the photosensitive drum 1. The pre-rotation process corresponds to the period during which a preparation operation prior to the image forming process is performed. The sheet interval process corresponds to the period between a plurality of recording materials P in a case of continuously performing the image forming process on the plurality of recording materials P (during a continuous image forming period). The post-rotation process corresponds to the period during which an arrangement operation (preparation operation) after the image forming process is performed. The non-image forming period refers to the period other than the image forming period and includes the above-described pre-rotation process, sheet interval process, post-rotation process, and a preliminary rotation process as a preparation operation which is performed when the power of the image forming apparatus 100 is turned ON or when the apparatus 100 is returned from the sleep mode.

5. Control Mode

FIG. 4 is a block diagram schematically illustrating a control mode of the main part of the image forming apparatus 100 according to the present exemplary embodiment. The image forming apparatus 100 includes the control unit 150. The control unit 150 includes a central processing unit (CPU) 151 as a calculation control unit serving as a central element for performing calculation processing), a nonvolatile memory 152 as a storage unit, an input/output unit (not illustrated) for controlling transmission and reception of signals to/from various elements connected with the control unit 150. The nonvolatile memory 152 is used to temporarily store control data and is also used as a work area for calculation processing involved in control. According to the present exemplary embodiment, the nonvolatile memory 152 can store a sheet counter N used to determine whether to perform foreign substance cleaning control (described below), information about the number of sheets when a plurality of recording materials P is continuously fed, and information about the total number of sheets having been fed by the image forming apparatus 100.

The control unit 150 controls the entire operations of the image forming apparatus 100. The control unit 150 controls transmission and reception of various electrical information signals and controls drive timings to perform a predetermined image forming sequence. Various units of the image forming apparatus 100 are connected with the control unit 150. According to the present exemplary embodiment, for example, the control unit 150 is connected with the charging power source E1, the developing power source E2, the transfer power source E3, the drive motor 110, the exposure unit (exposure apparatus) 4, and the door sensor S1.

The control unit 150 includes a counting unit 350 for performing the foreign substance cleaning control which characterizes the present exemplary embodiment. The counting unit 350 counts the number of printed sheets to perform the foreign substance cleaning control. If the count value exceeds a threshold value as a result of counting the number of printed sheets, the control unit 150 changes the condition for performing the foreign substance cleaning control. The number of printed sheets may be counted up or counted down. More specifically, the counting unit 350 may start counting from 0 and count up the number of sheets to the threshold value. Alternatively, a predetermined number of printed sheets may be stored in the memory 152, and the counting unit 350 may count down the number of sheets from the predetermined number of printed sheets until the count value becomes 0. The threshold value may be stored in the memory 152 as a first memory. Alternatively, a second memory (not illustrated) different from the first memory 152 is provided, and the threshold value may be stored in the second memory. The countdown method is employed in present exemplary embodiment, and "100 sheets" is stored as the predetermined number of sheets in the memory 152. When the counting unit 350 starts counting and the count value becomes 0, the control unit 150 changes the condition for performing the foreign substance cleaning control. More specifically, the control unit 150 performs control to perform the foreign substance cleaning control during the countdown, and performs control to not perform the foreign substance cleaning control when the countdown is finished, i.e., when the count value becomes 0. Since the countdown method is employed in the present exemplary embodiment, another threshold value is not separately provided. The counting unit 350 counts down the predetermined number of sheets. When the count value becomes 0, the control unit 150 changes the control execution condition. When changing the predetermined number of printed sheets, the predetermined number of printed sheets M (described below) maybe be changed, or a threshold value "0" may be provided and changed.

6. Issue of Present Exemplary Embodiment

The issue of the present exemplary embodiment will be described in detail below to make it easier to understand the control according to the present exemplary embodiment.

Figure 7:
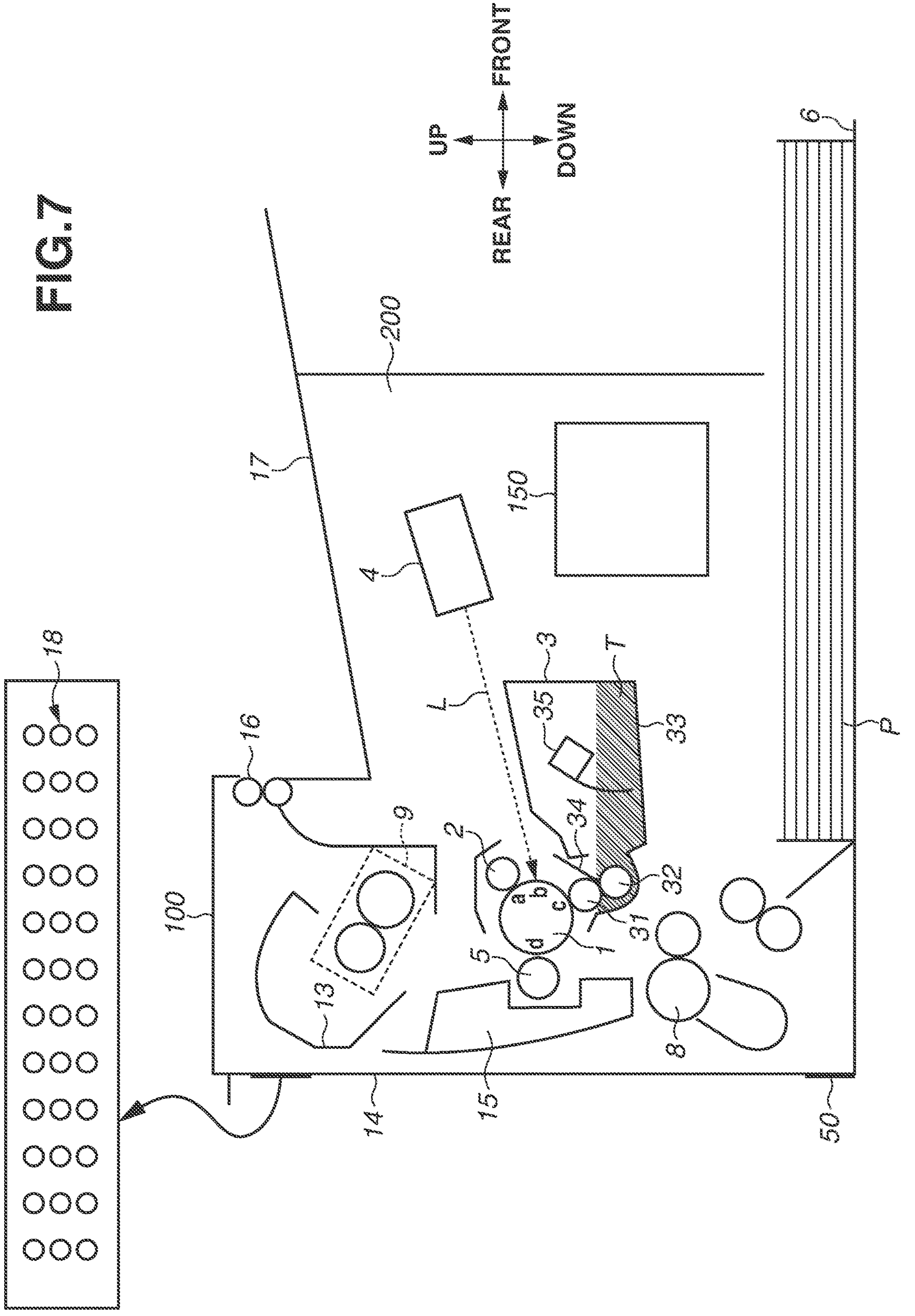
FIG. 7 is a diagram illustrating air holes on the rear door according to the first exemplary embodiment.

Positional relations between the members in the image forming apparatus 100 related to the issue of the present exemplary embodiment will be described below. Firstly, the front, rear, up, and down according to the present exemplary embodiment are defined as illustrated in FIG. 7. According to the present exemplary embodiment, an openable and closable rear door 14 is disposed on the rear side of the image forming apparatus 100. As illustrated in FIG. 7, according to the present exemplary embodiment, air holes 18 (enclosed by a thick line in FIG. 7) for discharging steam at an upper portion of the rear door 14. The air holes 18 are intended to prevent I steam that occurs when the recording material P passes through the fixing apparatus 9 from being condensed around the double-sided conveyance guide 13. FIG. 7 illustrates the air holes 18 as a first opening when the rear door 14 is viewed from the rear side of the image forming apparatus 100.

Figure 8:
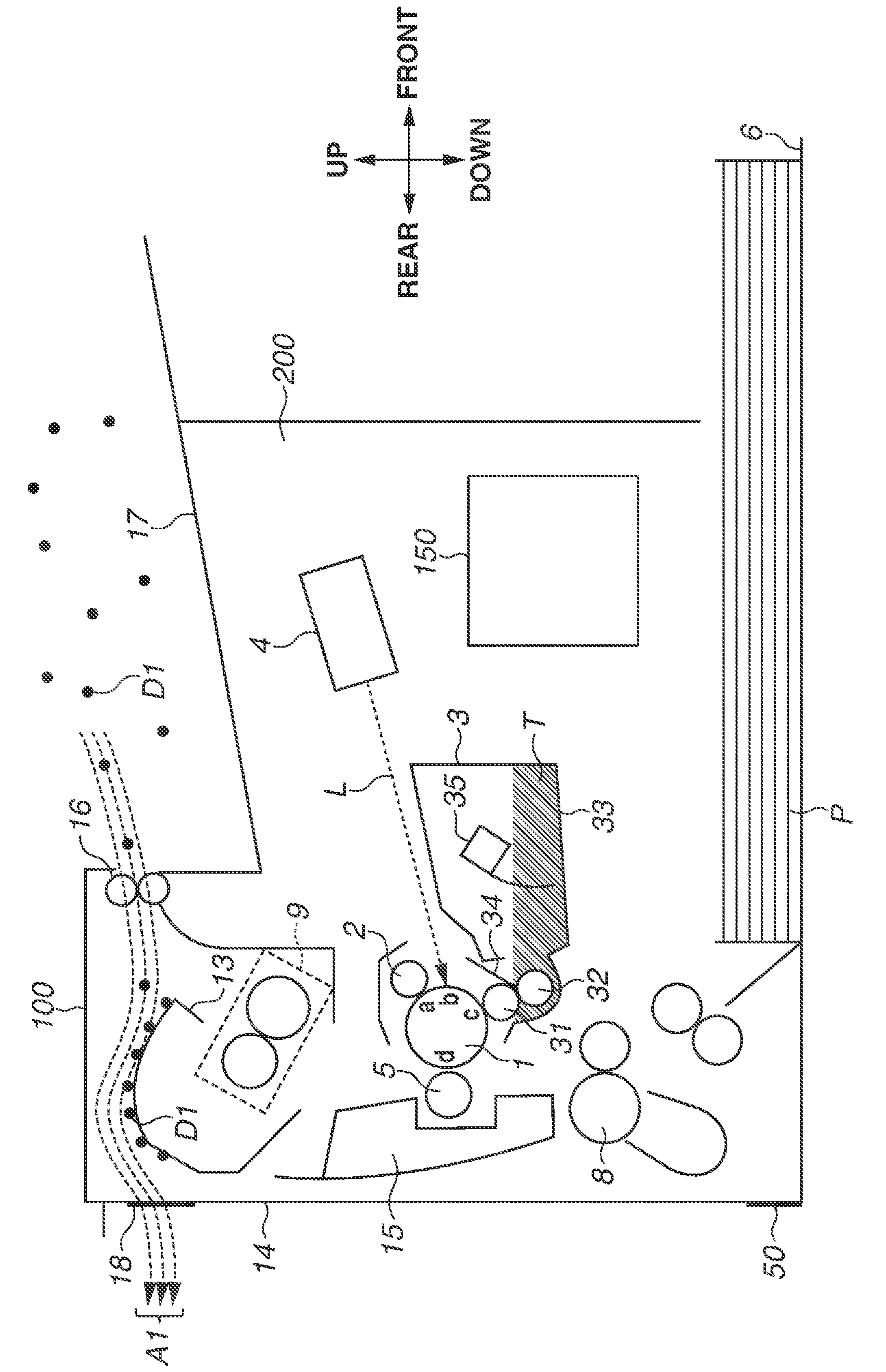
FIG. 8 is a diagram illustrating an air flow path between a discharge port and air holes, and accumulation of foreign substances.

According to the present exemplary embodiment, as illustrated in FIG. 8, an air passage (arrows A1 in FIG. 8) is formed between the discharge port 16 as a second opening and the air holes 18 of the rear door 14, and the double-sided conveyance guide 13 is disposed midway in the air passage A1. More specifically, the double-sided conveyance guide 13 is disposed between the discharge port 16 (second opening) and the air holes 18 (first opening) when viewed from either the rear side or front side of the image forming apparatus 100. The photosensitive drum 1 is disposed below the double-sided conveyance guide 13 in the direction of gravity and between the discharge port 16 and the rear door 14, i.e., between the discharge port 16 and the air holes 18.

In an assumed usage environment, foreign substances such as dust that have been stirred up by a wind from an air conditioner or ambient air enter the image forming apparatus 100. In the above-described configuration of the image forming apparatus 100, the air passage A1 is formed between the discharge port 16 and the air holes 18 on the rear door 14. The foreign substances D1 may enter the image forming apparatus 100 along this air flow path. The foreign substances D1 that has entered the image forming apparatus 100 accumulates in the air flow path. Particularly, in the configuration of the present exemplary embodiment, the foreign substances D1 are likely to accumulate on the double-sided conveyance guide 13, as illustrated in FIG. 8.

Figure 9:
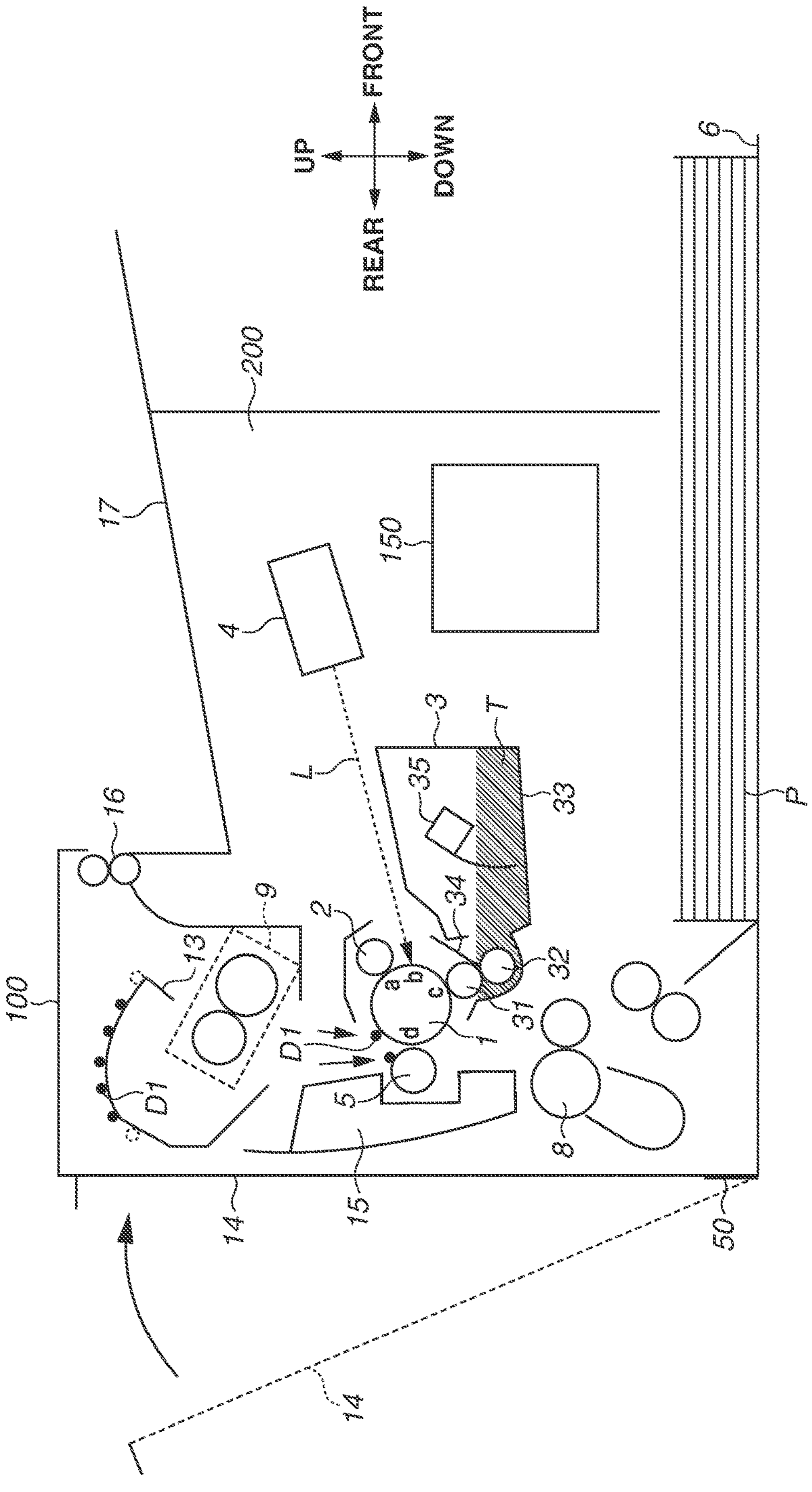
FIG. 9 is a diagram illustrating a state in which foreign substances fall down when the rear door is closed according to the first exemplary embodiment.

The foreign substances D1 continue to accumulate on the double-sided conveyance guide 13 during the normal operation such as the image forming operation. However, as illustrated in FIG. 9, the foreign substances D1 may fall from the double-sided conveyance guide 13 downwardly in the direction of gravity, for example, by a vibration that occurs when the user closes the rear door 14 after the jam removal processing. In the single-sided printing mode according to the present exemplary embodiment, the transfer guide unit 15 also needs to be opened and closed during the jam removal processing. According to the present exemplary embodiment, the vibration that occurs when the transfer guide unit 15 is closed tends to be larger than the vibration that occurs when the rear door 14 is closed because of the action of a spring (not illustrated), so that the amount of fallen foreign substances also tends to increase.

As illustrated in FIG. 9, in the configuration according to the present exemplary embodiment where the photosensitive drum 1 is disposed below the double-sided conveyance guide 13 on which the foreign substances D1 accumulate, the foreign substances D1 may possibly fall onto the vicinity of the photosensitive drum 1 by the vibration caused by the opening and closing of the rear door 14 and the transfer guide unit 15. In particular, the opening and closing of the transfer guide unit 15 involves the exposure of the photosensitive drum 1, and therefore the fallen foreign substances D1 may be likely to adhere to the photosensitive drum 1.

The arrangement of the components of the image forming apparatus 100 according to the present exemplary embodiment will be described below.

As illustrated in FIGS. 7 to 9, the apparatus main body 200 is provided with the air holes 18 as the first opening and the discharge port 16 as the second opening. When viewed from a direction perpendicular to the rotational axis direction of the photosensitive drum 1, the photosensitive drum 1 is disposed between the air holes 18 and the discharge port 16. Further, when viewed from the direction perpendicular to the rotational axis direction of the photosensitive drum 1, the double-sided conveyance guide 13 for conveying the recording material P in the double-sided printing mode is disposed between the air holes 18 and the discharge port 16. Furthermore, the rear door 14 is disposed on the surface opposite to the surface where a sheet feeding tray 6 is disposed, in the direction perpendicular to the rotational axis direction of the photosensitive drum 1. The air holes 18 are disposed on the rear door 14. The double-sided conveyance guide 13 is disposed in the vicinity of the rear door 14.

In the above-described configuration according to the present exemplary embodiment, the foreign substances D1 fall from the double-sided conveyance guide 13 by the vibration caused by the opening and closing of the rear door 14 and the transfer guide unit 15. If the foreign substances D1 adhere to the surface of the photosensitive drum 1, it possibly results in an image defect due to the foreign substances D1.

Examples of factors of the image defect include a case where the foreign substances D1 adhering to photosensitive drum 1 move to the charge roller 2 at the charging portion a and continue to accumulate on the charge roller 2, and eventually cause damage to the surface of the photosensitive drum 1. The damaged surface of the photosensitive drum 1 will cause black spots to appear at specific pitches in an image. In particular, relatively harder foreign substances D1 such as dust are more likely to damage the photosensitive drum 1 and more likely to cause a black spot image. The reason why black spots appear at specific pitches in an image is as described below.

Figure 10:
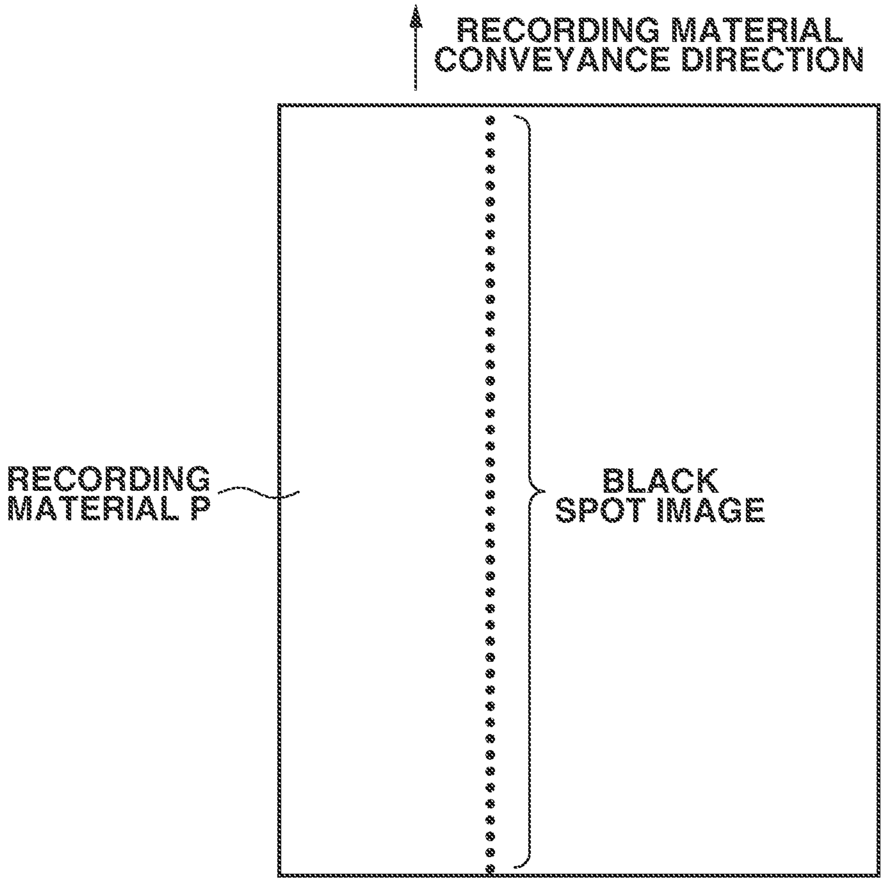
FIG. 10 is a diagram illustrating an example of an image defect according to the first exemplary embodiment.

As described above, according to the present exemplary embodiment, the charge roller 2 is rotatably driven at a constant circumferential speed ratio via the gear 12. Firstly, after the foreign substances D1 adhere to the charge roller 2, the foreign substances D1 damage the photosensitive drum 1 at the period of the charge roller 2. The charge roller gear 12 having 14 teeth as described above will damage the surface of the photosensitive drum 1 at pitches corresponding to the movement of the 14 teeth of the gear flange 11 of the photosensitive drum 1 (=$\varphi 24\times\pi\times 14$ teeth/37 teeth). The gear flange 11 of the photosensitive drum 1 has 37 teeth. Therefore, when the charge roller gear 12 and the gear flange 11 of the photosensitive drum 1 are rotatably driven for 518 (=$14\times 37$) teeth that is the least common multiple of the numbers of gears of the charge roller gear 12 and the gear flange 11, they return to the same position. During this period, the foreign substances D1 on the charge roller 2 damage the surface of the photosensitive drum 1 once at pitches of about 2 mm (=$\varphi 24\times\pi/37$ teeth). If the foreign substances D1 continue accumulating at the same position on the charge roller 2, the foreign substances D1 repeatedly damage the same position on the surface of the photosensitive drum 1. As a result, the charge transport layer of the surface of the photosensitive drum 1 gradually becomes thinner, and thus a concave portion is formed therein. The concave portion cannot hold charged electric charges. As a result, if electric charges of the charge transport layer cannot be held, the developer is developed on the photosensitive drum 1 at the developing portion c, resulting in a black spot image as illustrated in FIG. 10. Particularly under a high-temperature and high-humidity environment, electric charges around the concave portion are likely to flow into the concave portion having a low resistance, and thus the black spots tend to appear more visibly on an image.

As described above, the continuous accumulation of the foreign substances D1 on the charge roller 2 is the cause of the occurrence of a black spot image. Therefore, the occurrence of a black spot image can be prevented by immediately removing the foreign substances D1 having moved to the charge roller 2.

In the configuration according to the present exemplary embodiment, the foreign substances D1 having a larger size are less likely to adhere to the charge roller 2, and if they temporarily adhere to the charge roller 2, they are easier to be removed. On the contrary, the smaller foreign substances D1 are more likely to adhere to the charge roller 2. However, such foreign substances D1 are likely to be embedded in the coarse and elastically deformable surface of the charge roller 2, and the influence of the foreign substances D1 is likely to be absorbed. Therefore, the photosensitive drum 1 is unlikely to be damaged, and an image defect is unlikely to occur. In the configuration according to the present exemplary embodiment, the foreign substances D1 particularly having a size of about 50 to 300 μm are likely to accumulate on the charge roller 2 according to the above-described size and adhesion tendency of the foreign substances D1. Further, harder foreign substances D1 tend to more damage the photosensitive drum 1, resulting in an image defect.

Although FIGS. 7 to 9 illustrate only the rear door 14 as an openable and closable door, another door may be provided in addition to the rear door 14, or only the rear door 14 may be disposed. If there is no openable and closable door other than the rear door 14, all operations including the above-described jam removal processing and the replacement of the image forming unit are considered to be performed from the rear door 14. The image forming unit according to the present exemplary embodiment includes the photosensitive drum 1, the charge roller 2, the development apparatus 3, the exposure apparatus 4, and the transfer roller 5. The photosensitive drum 1, the charge roller 2, and the development apparatus 3 may be integrally configured as a cartridge that is attachable to and detachable from the image forming apparatus 100. Alternatively, the photosensitive drum 1 and the charge roller 2 may be integrally configured as a drum cartridge, and the development apparatus 3 may be configured as a developing cartridge. On the other hand, if another door is provided in addition to the rear door 14, the jam removal processing and the operation for replacing the image forming unit may be performed from the door other than the rear door 14. More specifically, the door other than the rear door 14 may produce a similar issue due to the vibration caused by the foregoing operations and the opening and closing of the door. The above-described door other than the rear door 14 may be a front door disposed on the front side of the image forming apparatus 100. For example, the discharge tray 17 may be opened and closed to serve as the front door. For the monochromatic image forming apparatus as described in the present exemplary embodiment, the above-described replacement of the image forming unit refers to the replacement of a cartridge or the transfer roller 5. For a color image forming apparatus, the replacement of the image forming unit includes the replacement of an intermediate transfer unit.

7. Control in the Present Exemplary Embodiment

Features of the control according to the present exemplary embodiment will be described below in consideration of the above-described issue. The present exemplary embodiment is characterized by determining the number of printed recording materials P at which the foreign substance cleaning control (described below) is performed after the opening and closing of the door, based on door opening and closing information about the rear door 14.

Figure 11A:
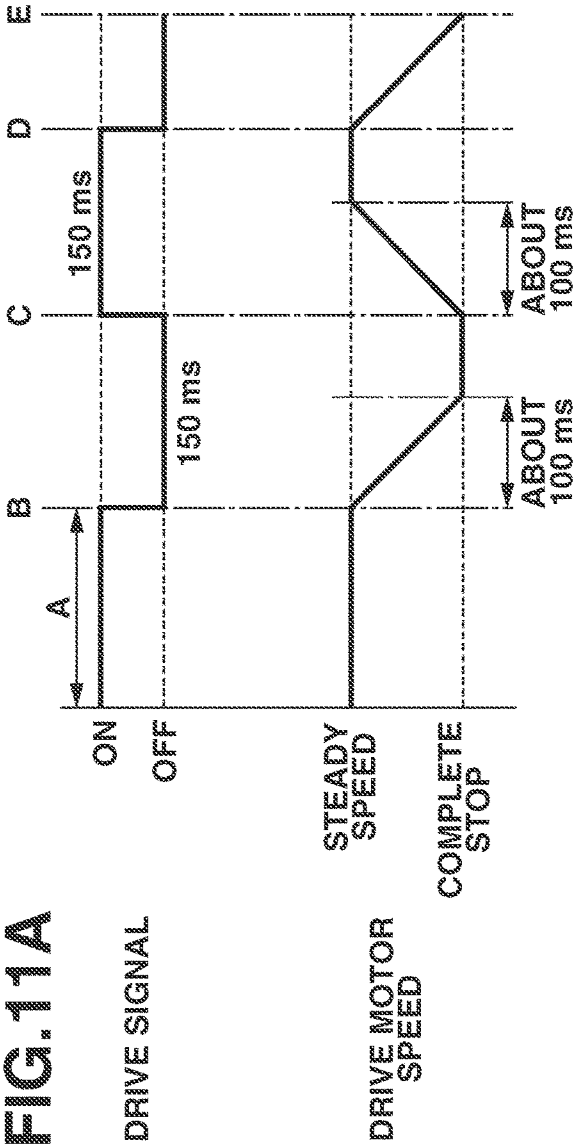
FIGS. 11A and 11B are timing charts illustrating foreign substance cleaning control according to the first exemplary embodiment.
Figure 11B:
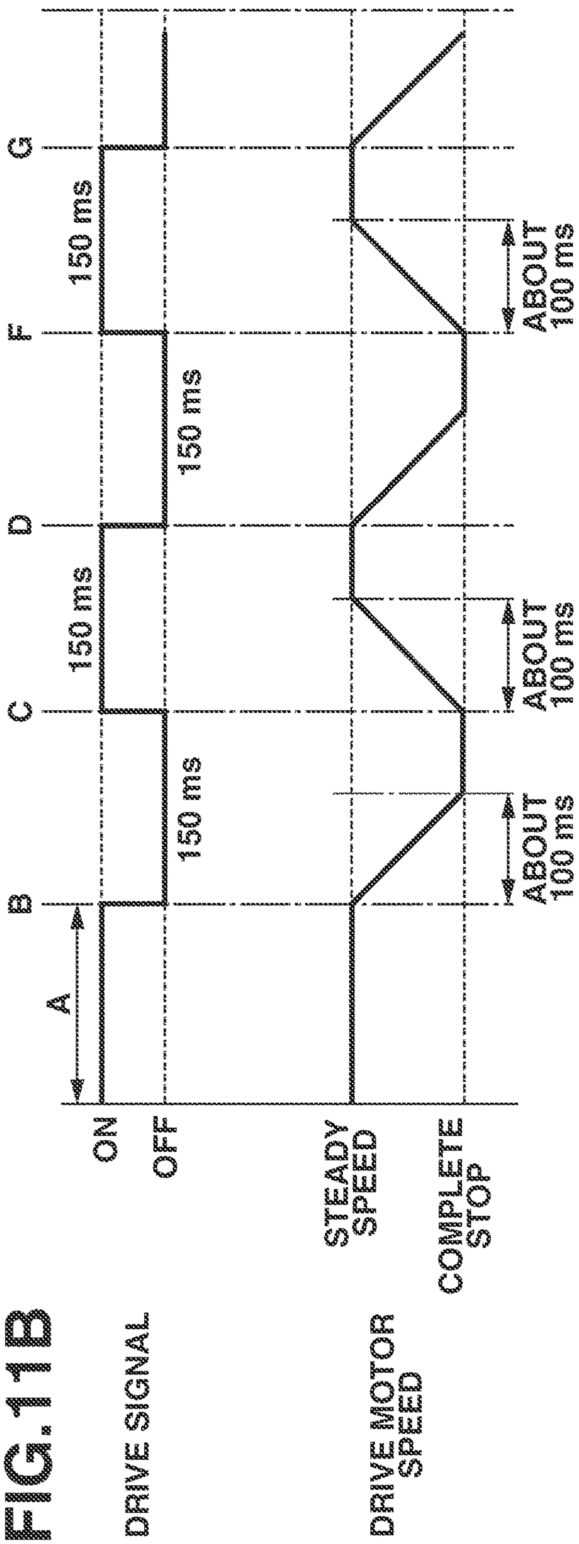

Firstly, the foreign substance cleaning control will be described below with reference to FIGS. 11A and 11B. The foreign substance cleaning control refers to a multiple switching operation in which control of driving, stopping and driving of the rotational operation of the photosensitive drum 1 is performed a plurality of number of times. FIG. 11A illustrates a case of performing the foreign substance cleaning control once, and FIG. 11B illustrates a case of performing the foreign substance cleaning control twice. FIGS. 11A and 11B are timing charts illustrating the driving signal and speed of the drive motor 110 in the foreign substance cleaning control according to the present exemplary embodiment. Referring to FIGS. 11A and 11B, the section A indicates a post-rotation process section after printing. At the timing B after the end of the post-rotation process, the control unit 150 transmits a stop instruction to the drive motor 110, and the drive motor 110 starts a stop operation. According to the present exemplary embodiment, the time taken from the timing B until when the drive motor 110 completely stops is about 100 msec. According to the present exemplary embodiment, because the drive motor 110 is driven again after it completely stops, the control unit 150 transmits a drive instruction to the drive motor 110 at 150 msec after the timing B (timing C). At this time, according to the present exemplary embodiment, the control unit 150 activates the drive motor 110 in the second mode of the image forming apparatus 100. According to the present exemplary embodiment, it takes about 100 msec for the drive motor 110 to reach the steady speed from the stop state. According to the present exemplary embodiment, after the drive motor 110 reaches the steady speed, the control unit 150 transmits a stop instruction again (timing D). The time from the timing C to the timing D is 150 msec which is longer than the activation time of the drive motor 110. According to the present exemplary embodiment, the rotational distance of the charge roller 2 from the timing C to the timing E is about 22 mm. If the stop operation after the post-rotation process prior to the foreign substance cleaning control and the start operation for the next job after the foreign substance cleaning control are combined, the total rotational distance is about 44 mm in a case where the foreign substance cleaning control is performed once. To clean the entire circumference of the charge roller 2, desirably, the rotational distance needs to be longer than the one round of the charge roller 2 (about 30.5 mm) like the present exemplary embodiment.

According to the present exemplary embodiment, the developing roller 31 is configured to be constantly in contact with the photosensitive drum 1 at the developing portion c.

Thus, it is necessary to prevent the developer from being developed on the photosensitive drum 1 during the foreign substance cleaning control. In addition, the control unit 150 performs the following control to collect the foreign substances D1 at the developing portion c so that the foreign substances D1, after being removed from the charge roller 2, do not adhere to the photosensitive drum 1 and then adhere to the charge roller 2 again after the photosensitive drum 1 rotates once. The control unit 150 applies a+150 V developing bias to the developing roller 31 from the time immediately before the activation of the drive motor 110 till the time immediately after the complete stop of the drive motor 110. According to the present exemplary embodiment, the control unit 150 changes the number of times of the above-described operation in the foreign substance cleaning control from the timing C to the timing E according to the number of sheets of the job. More specifically, the control unit 150 performs the above-described operation once in a case where the job has 1 to 9 sheets and twice in a case where the job has 10 or more sheets. After completion of the operation, it is determined that the foreign substance cleaning control is performed once.

Control for determining the number of sheets at which the foreign substance cleaning control is performed after the opening and closing of the door based on the door opening and closing information will be described below. To describe the control according to the present exemplary embodiment, first, the sheet counter N for determining whether to perform the foreign substance cleaning control will be described below. The sheet counter N counted by the counting unit 350 is an integer equal to or larger than 0. The sheet counter N is decremented by one each time printing is performed on a sheet. When the sheet counter N is 0, it remains 0 even after subsequent printing is performed. According to the present exemplary embodiment, when the sheet counter N is 1 or larger in the post-rotation process after printing, the control unit 150 performs the foreign substance cleaning control after the post-rotation process. When the sheet counter N is 0, the control unit 150 does not perform the foreign substance cleaning control.

The present exemplary embodiment is characterized by overwriting the value of the sheet counter N with the predetermined number of printed sheets M when the opening and closing of the rear door 14 is detected. Although, in the present exemplary embodiment, the predetermined number of printed sheets M is set to 100 (M=100), the predetermined number of printed sheets M can be suitably set. More specifically, "M=100" as the predetermined number of sheets M is stored in the memory 152, and when the counting unit 350 counts down the number of printed sheets and the count value becomes 0, the control unit 150 changes the execution condition for the foreign substance cleaning control. For example, the required frequency of the foreign substance cleaning control depends on the amount of the foreign substances D1 fallen onto the photosensitive drum 1 due to the vibration caused by the opening and closing of the door, and the configuration and member characteristics of the image forming apparatus 100, such as the easiness to remove the foreign substances D1 adhering to the charge roller 2. Therefore, the predetermined number of sheets M is not limited to this value. The control unit 150 performs the foreign substance cleaning control based on the opening and closing of the rear door 14 for the following reason. According to the configuration of the present exemplary embodiment, the user opens and closes the rear door 14 to perform the jam removal processing. In addition, the rear door 14 is disposed at a position close to the double-sided conveyance guide 13 where the foreign substances D1 accumulate. This means that the rear door 14 is an that can transmit a large vibration to the double-sided conveyance guide 13.

The control according to the present exemplary embodiment will be described below more specifically with reference to FIGS. 12A and 12B. In the following descriptions, all jobs are assumed to be 2-sheet jobs for simplification.

A control to be performed in a case where the user opens and closes the rear door 14 when the sheet counter N of the counting unit 350 is 0 will be described below with reference to FIG. 12A. Before the user opens and closes the rear door 14, the sheet counter N is initially 0, and hence the control unit 150 does not perform the foreign substance cleaning control after the post-rotation process in the job. Thereafter, when the user opens and closes the rear door 14 and the door sensor S1 detects information about the opening and closing of the door, the control unit 150 overwrites the sheet counter N with the predetermined number of sheets M (=100). Then, in the first job (job No. 1) after the user opens and closes the rear door 14, the sheet counter N is decremented by two during the printing operation. At this timing, since the sheet counter N indicates N=98>0, the control unit 150 performs the foreign substance cleaning control after the post-rotation process. The control unit 150 repeats the above-described operation up to the $^{49}$th job (job No. 49). When the $^{49}$th job (job No. 49) is completed, the sheet counter N is set to N=2 (=100−2×49). Then, in the $^{50}$th job (job No. 50), the sheet counter N is further decremented by two during the printing operation and becomes 0 (N=0). Therefore, the control unit 150 does not perform the foreign substance cleaning control after completion of the post-rotation process for the 50th job (job No. 50). Likewise, since N=0 in the 51st job (job No. 51) and subsequent jobs, the control unit 150 does not perform the foreign substance cleaning control after the post-rotation process. More specifically, the control unit 150 performs the foreign substance cleaning control during the countdown, but does not perform the foreign substance cleaning control when the countdown is completed. In other words, the control unit 150 does not perform the foreign substance cleaning control when the number of printed sheets becomes 0.

A control to be performed in a case where the user opens and closes the rear door 14 when the sheet counter N of the counting unit 350 is larger than 0 (N>0) will be described below with reference to FIG. 12B. In this case, since the N is initially larger than 0 (N>0), the control unit 150 performs the foreign substance cleaning control after the post-rotation process in the job. Thereafter, when the user opens and closes the rear door 14 and the door sensor S1 detects information about the opening and closing of the door, the control unit 150 overwrites the sheet counter N with the predetermined number of sheets M (=100). The subsequent operations are similar to those in FIG. 12A, and redundant descriptions thereof will be omitted.

The present exemplary embodiment is characterized by intensively performing the foreign substance cleaning control after the door opening and closing in order to prevent an image defect caused by the fallen foreign substances D1 after the opening and closing of the door. However, a similar effect can be obtained by constantly performing the control regardless of the opening and closing of the door. In this case, the foreign substance cleaning control is a rotation driving operation in addition to the regular job operation. More specifically, in the configuration according to the present exemplary embodiment in which the developing roller 31 is constantly in contact with the photosensitive drum 1 at the developing portion c, the developing roller 31 is also rotatably driven along with the operation of the foreign substance cleaning control. Therefore, if the control unit 150 performs the foreign substance cleaning control throughout the lifetime of the image forming apparatus 100, the frequency of toner rubbing on the developing roller 31 will increase. This promotes the toner degradation and causes the degraded toner to be developed on the photosensitive drum 1 of the non-image forming unit, possibly resulting in a fogging image.

As described above, black spot images and fogging images can be prevented by intensively performing the foreign substance cleaning control after the user opens and closes the rear door 14.

8. Image Evaluation Comparison Testing

The effect of the above-described control was evaluated with various conditions using the image forming apparatus 100.

More specifically, the following image evaluation comparative test is performed to compare black spot images and fogging images among a case where the foreign substance cleaning control is not performed after the job post-rotation process (first comparative example), a case where the foreign substance cleaning control is constantly performed (second comparative example), and the above-described present exemplary embodiment. In the present test, as the test condition, 50,000 sheets of recording materials P, which corresponds to the lifetime of the image forming apparatus 100 according to the present exemplary embodiment, are fed for a 2-sheet single-sided job in a high-temperature and high-humidity environment (32° C., 80% RH). The recording materials P used in the image evaluation are Century Star Paper (product name from CENTURY PULP AND PAPER).

In the present test, from the viewpoint of reproducibility, 0.5 g of natural quartz crystal powder No. 5 (manufactured by NAKAGAWA GOFUN ENOGU) is uniformly sprayed on the double-sided conveyance guide 13 in the longitudinal direction before the start of the evaluation in order to stabilize the scattered condition of the foreign substances D1. In the present test, a jam of the recording material P is forcibly generated once every 2,500 sheets, and an operation of opening and closing the rear door 14 is performed for the jam removal processing. At this timing, the foreign substances D1 falls on the vicinity of the photosensitive drum 1 by the vibration caused by the jam removal processing and the opening and closing of the rear door 14. In the present test, toner is supplied once every 10,000 sheets. The fog density on the recording material P is measured before the toner supply with the following method. A sticky note is attached on a part of a recording material P, and printing is performed on the recording material P. The printed image is an entirely white background image where nothing is printed. A white level T1 of a portion where the sticky note is not attached on the printed recording material P and a white level T2 of a portion where the sticky note is attached on the printed recording material P are measured by using fog measuring instrument (trade name REFLECTMETER MODEL TC-6DS manufactured by Tokyo Denshoku Co., Ltd.). From the measurement result, (T−T1) is calculated as the fogging toner density (%). In the present test, the image is determined to be "very good" in a case where the fogging toner density is lower than 3%, "good" in a case where the fogging toner density is 3% or more and 5% or less, and "not good (or poor)" in a case where the fogging toner density is 5% or more. If the fogging toner density is lower than 3%, a fogging toner is hardly visually recognized on the recording material P. If the fogging toner density is 3% or more and 5% or less, the fogging toner may be visually recognized depending on conditions but almost no issue arises in practical use. If the fogging toner density is 5% or more, the fogging toner is visually recognized on the recording material P.

In the present test, 50,000 sheets are fed for a 2-sheet job. Thus, the foreign substance cleaning control is performed 0 time according to the first comparative example, 25,000 times according to the second comparative example, and 980 (=((100/2)−1)×(50,000/2,500)) times according to the present exemplary embodiment. According to the present exemplary embodiment, the number of times of execution is calculated on the premise that the sheet counter N=100 in the new condition when the count is started. Evaluation results are illustrated in Table 1.

TABLE 1

| | Image | Number of fed sheets | | | | |
|---|---|---|---|---|---|---|
| | defect | 10,000 | 20,000 | 30,000 | 40,000 | 50,000 |
| First comparative example | Black spot lines | 4 | 7 | 9 | 10 | 11 |
| | Fogging | Very Good | Very Good | Very Good | Very Good | Very Good |
| Second comparative example | Black spot lines | 1 | 1 | 2 | 2 | 2 |
| | Fogging | Very Good | Very Good | Good | Good | Not Good |
| First exemplary embodiment | Black spot lines | 1 | 2 | 2 | 2 | 2 |
| | Fogging | Very Good | Very Good | Very Good | Very Good | Very Good |

Table 1 illustrates results of performing the present test in the first and second comparative examples and the first exemplary embodiment. The results include the number of black spot lines occurring on the image and the fogging toner density for every 10,000 fed sheets. The number of black spot lines occurring on the image refers to the number of lines of black spots occurring at 2 mm pitches in a direction perpendicular to the conveyance direction of the recording material P. For example, in the case illustrated in FIG. 10, the number of black spot lines is counted as one.

In the first comparative example in Table 1, the foreign substance cleaning control is not performed. Therefore, the number of black spot lines occurring on the image increases with an increase in the cumulative number of fed sheets. On the other hand, in the second comparative example and the first exemplary embodiment, the occurrence of black spot lines is suppressed. In the first exemplary embodiment, the foreign substance cleaning control is performed a smaller number of times than the second comparative example. However, in the first exemplary embodiment and the second comparative example, the numbers of black spot lines occurring on the image are almost the same. This suggests that the foreign substances D1 that have fallen on the surface of the photosensitive drum 1 by the opening and closing of the rear door 14 have been removed from the charge roller 2 by the foreign substance cleaning control during 100-sheet printing after the opening and closing of the rear door 14. Referring to the result of the fogging toner density measurement, while the fogging density is worsened with an increase in the number of fed sheets in the second comparative example, the fogging density remains at about the level without getting worse in the first exemplary embodiment. From the above, it can be considered that toner is degraded as the number of times of the foreign substance cleaning control increase as described above, and thus fogging is worsened.

From the above, it is possible to prevent occurrence of black spot images and fogging images by intensively performing the foreign substance cleaning control after the opening and closing of the door.

9. Effect of the Present Exemplary Embodiment

As described above, according to the present exemplary embodiment, additionally performing the foreign substance cleaning control after the post-rotation process in the job can improve the performance for cleaning the foreign materials adhering to the charge roller 2, thus preventing the occurrence of a black spot image. The present exemplary embodiment is characterized by the following features.

The image forming apparatus 100 can perform the image forming operation to form an image on the recording material P as a transfer material. The image forming apparatus 100 includes the apparatus main body 200, the rotatable photosensitive drum 1, and the charge roller 2, as a charging member, that comes into contact with the photosensitive drum 1 to form the charging portion b and charges the surface of the photosensitive drum 1 at the charging portion b. The image forming apparatus 100 includes the developing roller 31, as a developing member, for supplying a toner to the surface of the photosensitive drum 1 charged by the charge roller 2. The image forming apparatus 100 includes the transfer roller 5, as a transfer member, that comes into contact with the photosensitive drum 1 to form the transfer portion d and transfers the toner image formed on the photosensitive drum 1 to the recording material P at the transfer portion d. The image forming apparatus 100 includes the rear door 14 as a moving member movable between the open position where the inside of the apparatus main body 200 is exposed and the shielding position where the inside of the apparatus main body 200 is shielded. The image forming apparatus 100 includes the door sensor S1 as a detection unit for detecting information about a first movement in which the rear door 14 moves from the open position to the shielding position or a second movement in which the rear door 14 moves from the shielding position to the open position, and includes the drive motor 110 as a drive source for rotatably driving the photosensitive drum 1. The image forming apparatus 100 includes the control unit 150 for controlling the drive motor 110.

During the period in which a non-image forming operation other than the image forming operation is performed, the control unit 150 performs control to execute a multiple switching operation for stopping the photosensitive drum 1 in the state where the photosensitive drum 1 is driven, stopping the photosensitive drum 1 and driving the photosensitive drum 1 to rotate again, and the control unit 150 performs this multiple switching operation a plurality of times. The multiple switching operation refers to the above-described foreign substance cleaning control. When the door sensor S1 detects the information about the first movement in which the rear door 14 moves from the open position to the shielding position or the second movement in which the rear door 14 moves from the shielding position to the open position, the control unit 150 performs control to execute the multiple switching operation.

When the door sensor S1 detects the information about the first movement or the second movement, the control unit 150 performs the multiple switching operation during the non-image forming operation performed after the image forming operation.

When the door sensor S1 detects the information about the first movement or the second movement, the control unit 150 performs the multiple switching operation during the non-image forming operation performed before the image forming operation.

According to the exemplary embodiment, the image forming apparatus 100 further includes the counting unit 350 for counting information about the number of recording materials P with images formed thereon by the image forming operation. The control unit 150 performs the multiple switching operation based on the information about the number of recording materials P counted by the counting unit 350. The information about the number of recording materials P refers to the number of printed recording materials P, and the control unit 150 performs the multiple switching operation until the number of printed recording materials P exceeds a predetermined number of sheets. The counting unit 350 counts down the number of printed recording materials P from the predetermined number of sheets, and the control unit 150 performs the multiple switching operation until the number of printed recording materials P becomes 0. The image forming apparatus 100 further includes the first memory for storing a first threshold value for the number of recording material P. The control unit 150 may perform the multiple switching operation based on the information about the number of recording materials P counted by the counting unit 350 and the first threshold value.

The information about the number of recording materials P refers to the number of printed recording materials P, and the first threshold value is the threshold value for the number of printed recording materials P. The control unit 150 may perform the multiple switching operation until the number of printed recording materials P exceeds the threshold value for the number of printed recording materials P.

The apparatus main body 200 is provided with the air holes 18 as the first opening and the discharge port 16 as the second opening. When viewed from the direction perpendicular to the rotational axis direction of the photosensitive drum 1, the photosensitive drum 1 is disposed between the first opening 18 and the second opening 16. When viewed from the direction perpendicular to the rotational axis direction of the photosensitive drum 1, the double-sided conveyance guide 13 for conveying the recording material P in the double-sided printing mode is disposed between the first opening 18 and the second opening 16.

The image forming apparatus 100 further includes the storage portion 6 as a sheet feeding tray for storing the recording materials P. The rear door 14 as a moving member is disposed on the surface opposite to the surface where the sheet feeding tray 6 is disposed, in the direction perpendicular to the rotational axis direction of the photosensitive drum 1. The air holes 18 as the first opening are disposed on the rear door 14 as a moving member. The double-sided conveyance guide 13 is disposed in the vicinity of the rear door 14 as a moving member.

Figure 13:
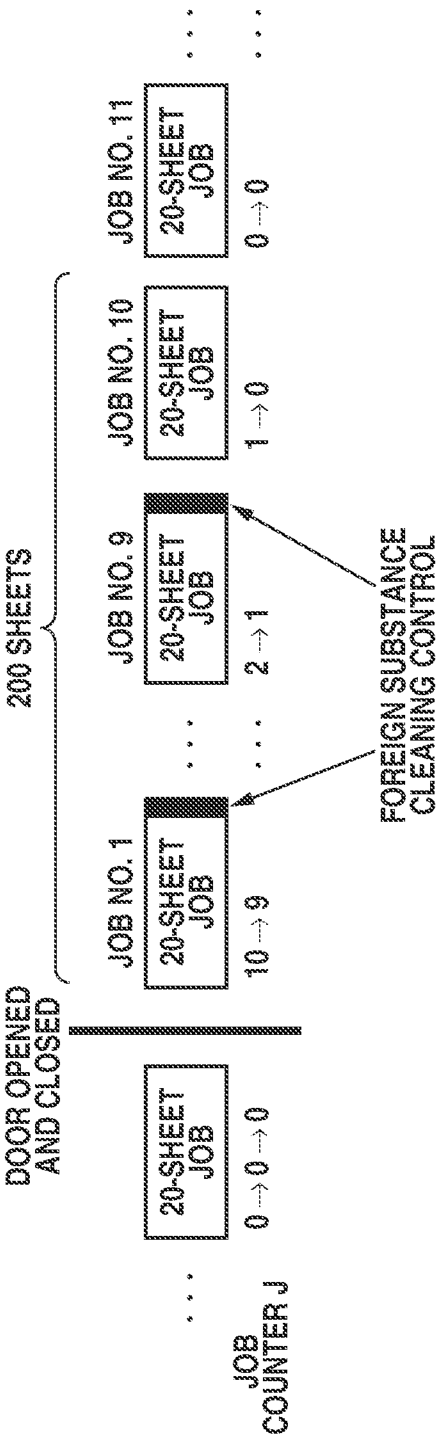
FIG. 13 is a diagram illustrating the foreign substance cleaning control after opening and closing of the door according to the first exemplary embodiment.

In the present exemplary embodiment, the effect produced in a case where the foreign substance cleaning control is performed once after a 2-sheet job has been described. However, in a case of a user who often executes long jobs, if the foreign substance cleaning control is stopped when 100 sheets are printed, the number of times of the foreign substance cleaning control is not sufficient, possibly resulting in insufficient cleaning performance. For example, when a 99-sheet job is executed, the foreign substance cleaning control is performed only once. When a 100-sheet job is executed, the foreign substance cleaning control is not performed. Therefore, a job counter may be provided in addition to the above-described sheet counter. The job counter is characterized by overwriting the value of a job counter J for counting the number of jobs after the detection of the opening and closing of the rear door 14 with a predetermined value K. Like the sheet counter, the value of the job counter J is an integer equal to or larger than 0, and is decremented by one for each job. If the job counter J is 0, it remains 0 even after printing is performed. FIG. 13 illustrates an example case where a 20-sheet job is repeated with K set to 10 (K=10). In this case, after the opening and closing of the rear door 14, the control unit 150 performs the foreign substance cleaning control for 9 jobs (job Nos. 1 to 9) and does not perform the control for the $^{10}$th job (job No. 10) and subsequent jobs. Performing control based on the number of jobs in this way also allows a sufficient number of times of the foreign substance cleaning control to be secured even for a user who executes a long printing job at a time.

For example, when a 100-sheet job is executed, a sufficient number of times of the foreign substance cleaning control can be secured by dividing the job by 10 sheets and controlling the foreign substance cleaning control to be forcibly performed. Therefore, according to the exemplary embodiment, the control unit 150 performs the multiple switching operation based on information about the number of jobs of the recording materials P counted by the counting unit 350. The control unit 150 may perform the multiple switching operation until the number of jobs of the recording materials P exceeds a predetermined number of jobs. The image forming apparatus 100 further includes the first memory for storing a first threshold value for the number of recording material P. The control unit 150 may perform the multiple switching operation based on the information about the number of jobs of the recording materials P counted by the counting unit 350 and the first threshold value. The control unit 150 may perform the multiple switching operation until the number of jobs of the recording materials P exceeds the threshold value. According to the exemplary embodiment, the counting unit 350 counts down the number of jobs of the recording materials P from the predetermined number of jobs, and performs the multiple switching operation until the number of jobs for the printed recording materials P becomes 0.

The present exemplary embodiment has been described above centering on an example using the sheet counter for counting the number of sheets. In double-sided printing, since each sheet has front and rear surfaces and each of the front and rear surfaces of a sheet can be counted as one surface, the sheet counter may also be referred to as a surface counter.

Although, in the present exemplary embodiment, the number of times of the foreign substance cleaning control is changed according to the number of sheets of the job, the relation between the number of sheets of the job and the number of times of the foreign substance cleaning control is not limited thereto but may be suitably changed according to the configuration of the image forming apparatus 100. The running distance of the photosensitive drum 1 in a job may be monitored, and the number of times of the foreign substance cleaning control may be changed according to the running distance. More specifically, if the control unit 150 performs the same control as in the case where the number of times of the foreign substance cleaning control increases with an increase in the number of sheets of the job, the control unit 150 increases the number of times of the foreign substance cleaning control with an increase in the running distance. For example, according to the exemplary embodiment, the first memory may store a second threshold value for the number of times of the multiple switching operation, and the control unit 150 may perform the multiple switching operation based on the second threshold value.

Although, in the present exemplary embodiment, the sheet counter N is set to 100 after the control unit 150 detects the opening and closing of the rear door 14, the overwrite value with which the counter value is overwritten may be changed according to the varying foreign substance cleaning performance depending on, for example, the durability characteristics of members. For example, the value of the counter N may be overwritten with 100 from when the image forming apparatus 100 is in a new condition until the 10,0$^{00}$th sheet, and the value of the counter N may be overwritten with 50 after the 10,001st sheet and subsequent sheets.

Although, in the present exemplary embodiment, the sheet counter and the job counter each count down the number, the counters may count up to predetermined upper limits.

Although, in the present exemplary embodiment, the value M with which the value of the sheet counter is overwritten is a constant number of 100, the configuration is not limited thereto. For example, when the amount of accumulated foreign substances is estimated based on the cumulative number of fed sheets of the image forming apparatus 100, a calculation formula may be defined in which the cumulative number of fed sheets is set to a variable, and the overwrite value M with which the value of the sheet counter is overwritten may be calculated based on the defined calculation formula.

As a method for calculating the overwrite value M for the sheet counter, the value may be overwritten by multiplying a constant as the base of the calculation by a coefficient, instead of overwriting the constant. For example, assuming that the maximum number of sheets to be printed is 1,000, the value M may be calculated by multiplying $\alpha=0.1$ to obtain $1{,}000\times\alpha=100$ and used to overwrite the counter. Further, the overwrite value M may be optimized according to the characteristics of the image forming apparatus 100 by changing the coefficient according to the cumulative number of fed sheets.

Although, in the present exemplary embodiment, when the sheet counter N before the opening and closing of the rear door 14 is larger than 0 (N>0), the sheet counter N is set to 100 (N=100) when the rear door 14 is opened and closed. However, if the foreign substances D1 will not accumulate for a while after the foreign substances D1 fall, the foreign substances D1 do not fall even if the rear door 14 is opened and closed. Therefore, the counter may not be overwritten until the sheet counter becomes 0 (N=0) even if the rear door 14 is opened and closed.

Although the present exemplary embodiment has been described above centering on an example case where the door sensor S1 for detecting the opening and closing of the rear door 14 is provided, the present exemplary embodiment is not limited thereto. The present exemplary embodiment is also applicable if the moving member is movable e between an open position where the inside of the image forming apparatus 100 is exposed and a shielding position where the inside of the apparatus is shielded and may apply a vibration to the inside of the image forming apparatus 100. Examples of the moving member include a sheet feeding cassette to be opened and closed when supplying recording materials P, and a door to be opened and closed when replacing a cartridge, transfer unit, or fixing unit. Examples of the moving member also include a cover member that needs to be moved to access a supply port when supplying toner, and a cover member of a scanner apparatus to be opened and closed when copying an image. In these members, if the moving operation can be detected like the rear door 14, the same control may be executed.

The present exemplary embodiment has been described above centering on an example case where the opening and closing of the rear door 14 is detected. In this case, it is assumed that the opening and closing of the rear door 14 cannot be detected in consideration of a case where the power inlet is unplugged from an inlet plate 50. If the control unit 150 detects the plugging and unplugging of the power inlet to/from the inlet plate 50, the control unit 150 may perform the control according to the present exemplary embodiment in consideration of the possibility of the opening and the closing of the rear door 14. The control unit 150 may additionally include a detection unit for detecting a first state where the power inlet is plugged into the inlet plate 50 as a holding member and a second state where the power inlet is unplugged from the inlet plate 50.

According to the present exemplary embodiment, the drive motor 110 is configured to drive the photosensitive drum 1, and accordingly drive the charge roller 2 via the gears 11 and 12. However, a similar effect can be obtained if the drive motor 110 is configured to drive the charge roller 2 and drive the photosensitive drum 1 via the gears 11 and 12.

According to the present exemplary embodiment, the speed of the drive motor 110 in increased to enter the second mode as the highest speed mode among printing modes of the image forming apparatus 100. However, needless to say, a larger effect can be obtained by driving the photosensitive drum 1 at a higher speed as a dedicated speed for the foreign substance cleaning control.

Although, in the present exemplary embodiment, a non-magnetic one-component developer is used as a toner, a magnetic one-component developer is also applicable.

Figure 21:
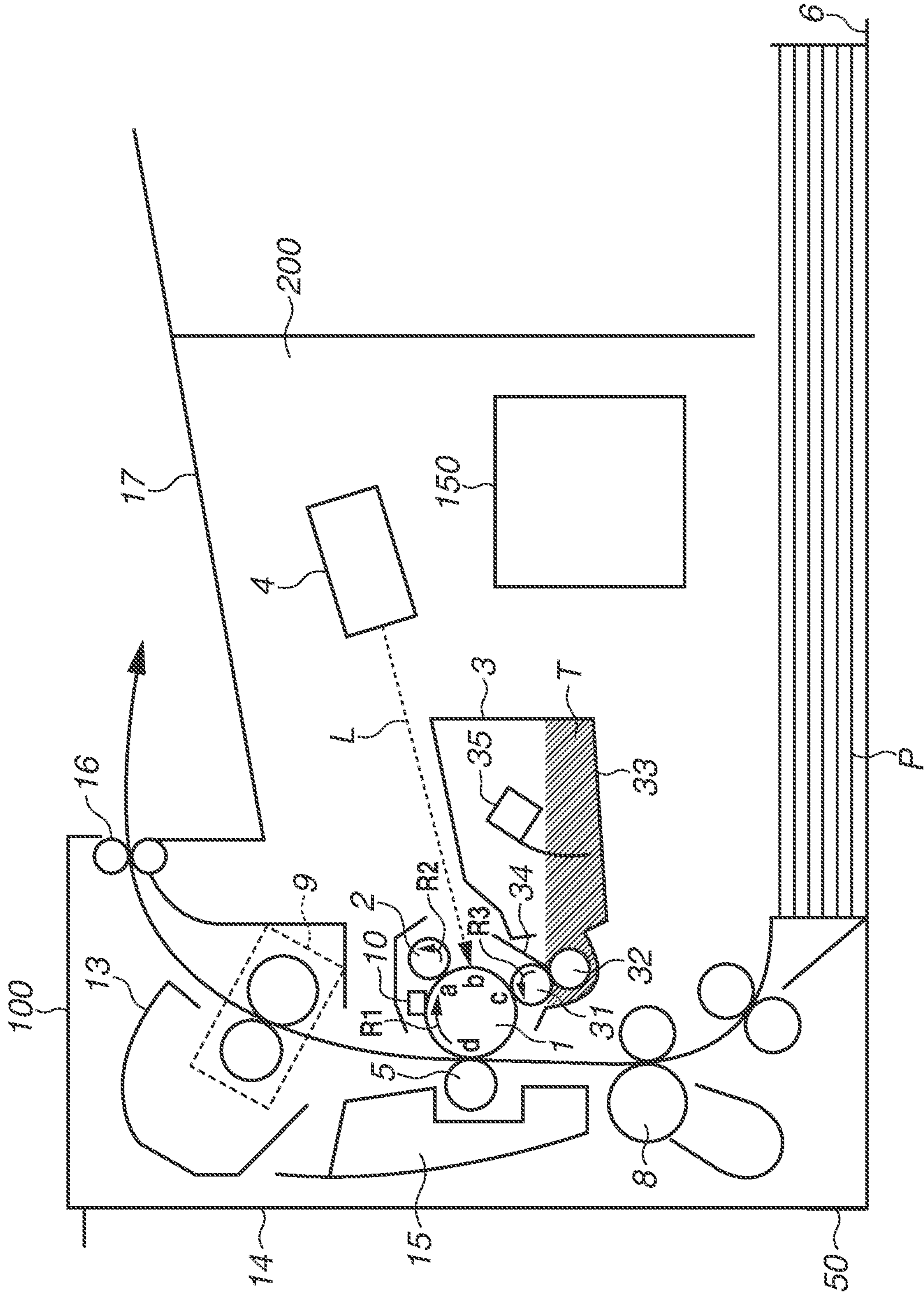
FIG. 21 is a diagram illustrating a brush member as a collecting member for collecting paper powder.

The present exemplary embodiment has been described above centering on a configuration where no member is disposed in contact with the photosensitive drum 1 between the transfer portion d and the charging portion a in the rotational direction of the photosensitive drum 1. However, a configuration where such a member is disposed is also applicable. For example, it is needless to say that a similar effect can be also obtained in a case where the foreign substances D1 may possibly pass through the member in contact with the photosensitive drum 1 and reach the charge roller 2. Examples of the member in contact with the photosensitive drum 1 include a collecting member for collecting paper powder and making the developer to pass therethrough, such as a brush member 10 illustrated in FIG. 21. For example, in the present exemplary embodiment, the brush member 10 made of a base cloth formed of a synthetic fiber containing carbon, and a conductive yarn made of conductive 6 nylon interwoven in the base cloth is used. Examples of configurations of the brush member 10 include a configuration of 2 deniers, a density of 240 kilo-Filaments/inch$^2$ (kF/inch$^2$), a length of the conductive yarn of 6.5 mm, and an intrusion amount of 1 mm. The thickness of the conductive yarn is desirably 1 to 10 deniers, and more desirably 1 to 6 deniers. The density of the conductive yarn of the brush member 10 is desirably 150 kF/inch$^2$ or higher.

According to the present exemplary embodiment, the foreign substances D1 that are likely to move to the photosensitive drum 1 at the transfer portion d possibly have an electrostatically positive polarity. Therefore, the potential relation between the surface potentials of the charge roller 2 and the photosensitive drum 1 passing through the charging portion a in the stop operation of the foreign material cleaning control may assist the foreign substance cleaning. For example, it is more effective if the charging voltage of the charge roller 2 is turned OFF and the surface potential of the photosensitive drum 1 is set to −300V to form a potential difference therebetween to cause the foreign substances D1 with the positive polarity to move to the photosensitive drum 1.

10. Relation Between Speeds of Charge Roller and Photosensitive Drum and Foreign Substance Cleaning Performance The present exemplary embodiment has been described above centering on a configuration where the surface speed of the charge roller 2 is higher than that of the photosensitive drum 1. The comparison of the effects of the foreign substance cleaning between this configuration and the configuration where the surface speed of the charge roller 2 is lower than that of the photosensitive drum 1 will be described below.

Figure 14:
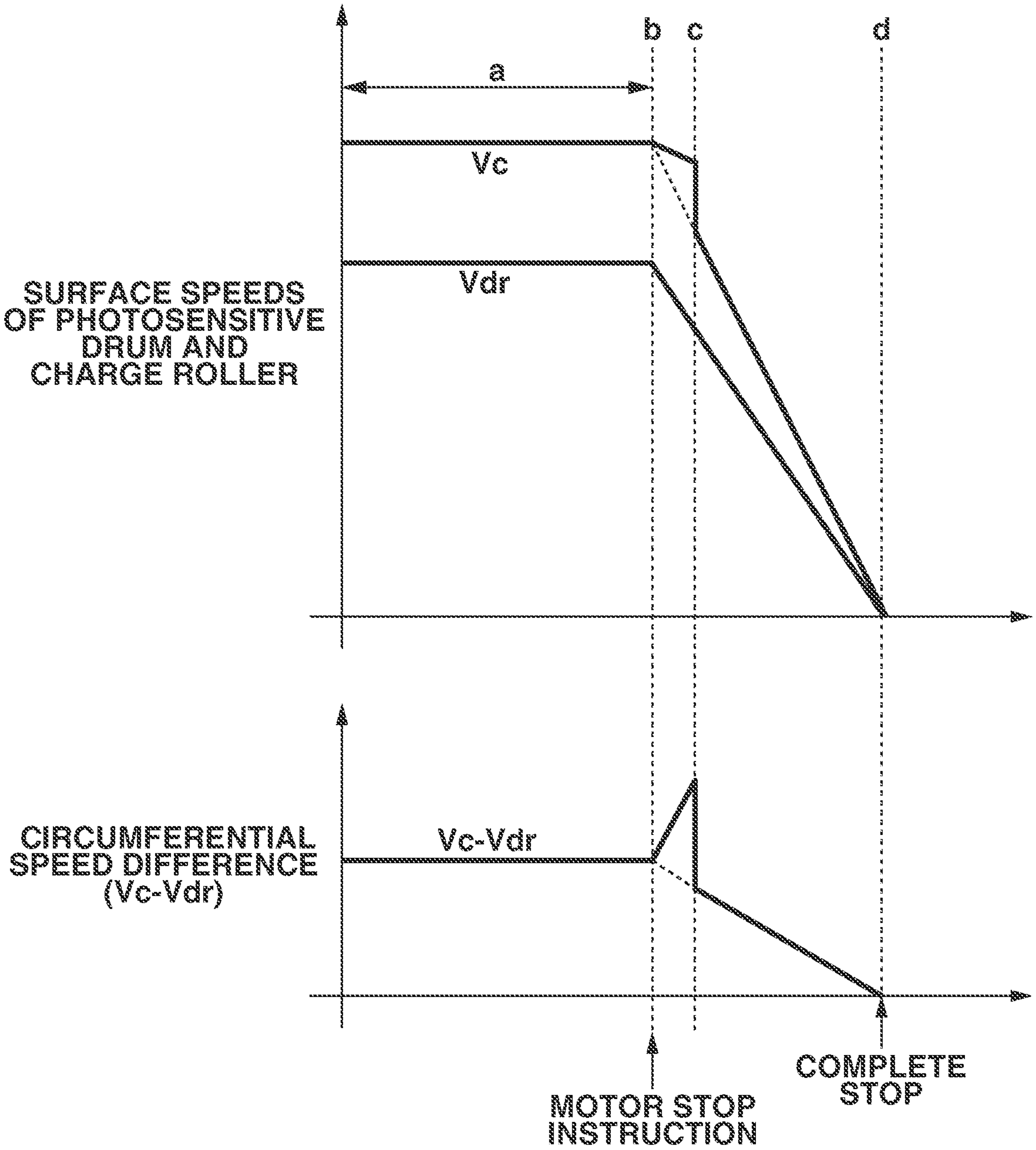
FIG. 14 is a diagram illustrating a relation between speeds of the photosensitive drum and the charge roller when they are stopped according to the first exemplary embodiment.

The reason why the performance for cleaning the foreign materials adhering the charge roller 2 is improved in the configuration where the surface speed of the charge roller 2 is higher than that of the photosensitive drum 1 will be described below with reference to FIG. 14. FIG. 14 illustrates a surface speed Vdr of the photosensitive drum 1, a surface speed Vc of the charge roller 2, and a speed difference V−Vdr in a section between the normal rotation and the complete stop of the drive motor 110. More specifically, FIG. 14 illustrates surface speed variations in the sections A to C of FIGS. 11A and 11B.

The section a in FIG. 14 indicates the normal rotation (timing A in FIGS. 11A and 11B), indicates Vc>Vdr, and indicates a state where the charge roller 2 and the photosensitive drum 1 are rotating at a constant speed difference (V−Vdr). At this timing, the gear flange 11 of the photosensitive drum 1 and the charge roller gear 12 are engaged with each other. As illustrated in FIG. 6, the gears 11*a* of the gear flange 11 are engaged with the gears 12*a* of the charge roller gear 12 in such a way that the tooth surfaces of the gears 11*a* pushes the tooth surfaces of the gears 12*a* of the charge roller gear 12, and the gear flange 11 and the charge roller gear 12 rotate.

Then, when the control unit 150 instructs the drive motor 110 to stop at the timing b (timing B in FIGS. 11A and 11B), the rotational speed of the photosensitive drum 1 connected with the drive motor (drive source) 110 starts decelerating. At this timing, the rotational speed of the charge roller 2 cannot follow the deceleration of the photosensitive drum 1, and hence the speed difference temporarily increases in a certain section. The section where the speed difference increase arises corresponding to the back-lash between the gap between the gears 11 and 12. If the engagement between the tooth surfaces of the gears 11*a* of the gear flange 11 and the tooth surfaces of the gears 12*a* of the charge roller gear 12 changes from the state in FIG. 6 to the state in FIG. 16, the charge roller 2 and the photosensitive drum 1 decelerate while maintaining the circumferential speed ratio determined by the gear train and comes to a complete stop.

The foreign substances D1 adhering to the charge roller 2 are removed by the friction generated by the speed difference between the charge roller 2 and the photosensitive drum 1 at a charge nip portion a in the charging portion a, where the charge roller 2 and the photosensitive drum 1 come into contact with each other. During the normal rotation, the foreign substances D1 are removed to a certain extent by the speed difference at the charge nip portion a but may not be completely removed. In the foreign substance cleaning control according to the present exemplary embodiment, the section (between the timings b and c) where the speed difference temporarily increases in the stop operation is intentionally formed to increase the frictional force. Further, increasing the frequency of this stop operation enables the foreign substances D1 that cannot be removed during the normal rotation to be removed. According to the configuration of the present exemplary embodiment, the period between the timings b and c is about 6 msec. The present exemplary embodiment is characterized by activating the drive motor 110 in the second mode, not in the first mode, to maximize the speed difference at the charge nip portion a to produce a larger frictional force. More specifically, driving the drive motor 110 at a speed higher than the lowest speed among the process speeds of the image forming apparatus 100 can achieve a larger effect of the foreign substance cleaning than in a case of driving the drive motor 110 at the lowest speed. The speed in the second mode needs to be higher than that in the first mode, and the higher driving speed provides a larger effect.

The higher driving speed before a print job stops and the higher re-driving speed after the job stops provide a larger effect of the foreign substance cleaning. However, when the print job stops, the foreign substances D1 that have not been removed from the surface of the charge roller 2 may remain on the surface of the charge roller 2 in an unstable adhesion state. In this state, if a print job operation is successively started, the adhesion of the foreign substances D1 may stabilize during the normal rotation.

Therefore, as in present exemplary embodiment, if the drive motor 110 is re-driven at a higher speed after the stop before the adhesion of the foreign substances D1 is stabilized again, the foreign substances D1 in the unstable adhesion state can be effectively removed from the surface of the charge roller 2.

In the above-described configuration, the comparison is made only between the speeds in the image forming mode. However, the present exemplary embodiment is not limited thereto if the image forming apparatus 100 has a special operation mode in which the apparatus 100 operates at a speed different from that in the image forming mode. More specifically, the lowest speed mode among the operation modes including the above-described operations corresponds to the first mode. A similar effect can be obtained by operating the drive motor 110 at a higher speed than that in the first mode.

Figure 15:
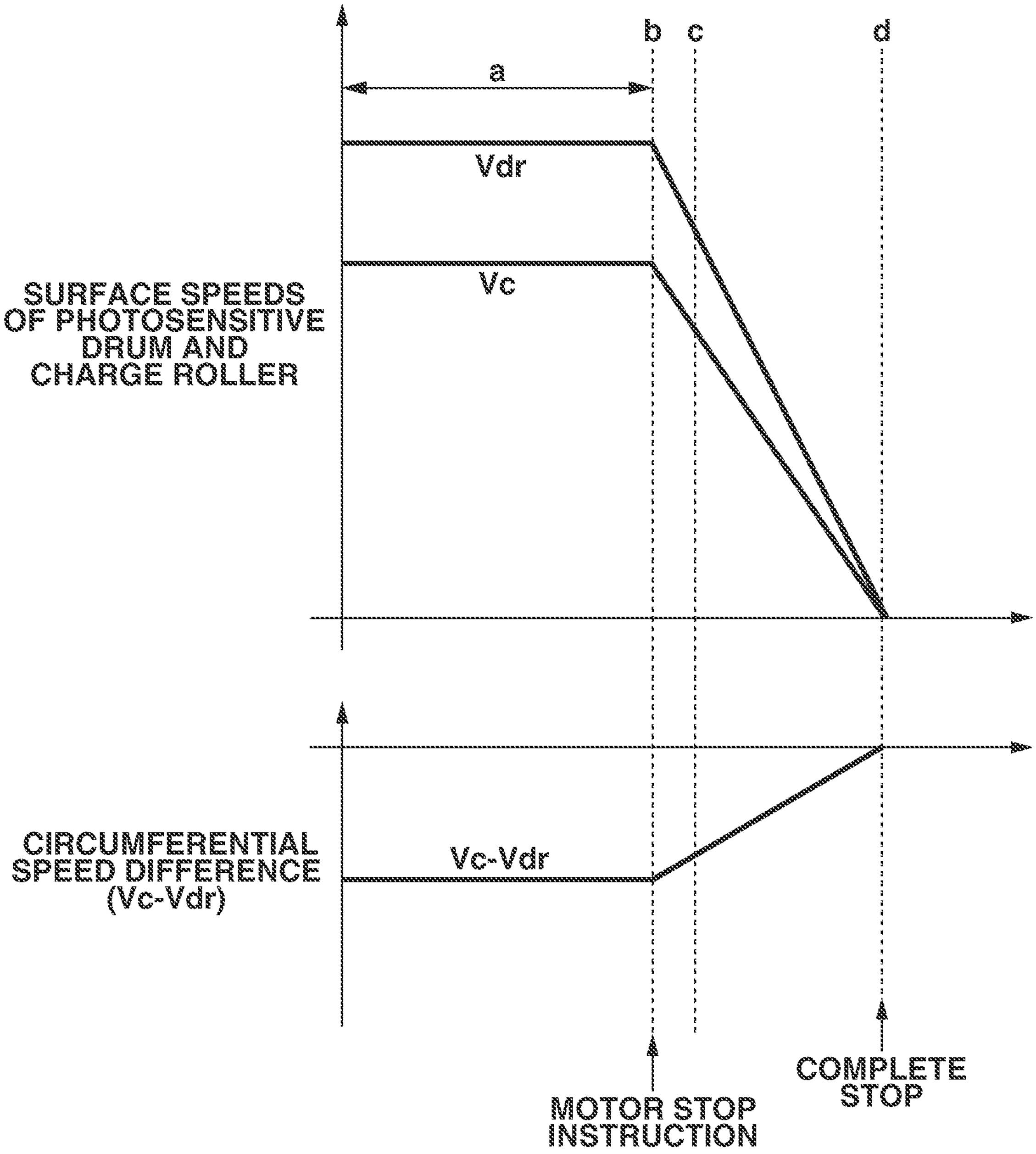
FIG. 15 is a diagram illustrating a relation between speeds of the photosensitive drum and the charge roller when they are stopped according to the first exemplary embodiment.

FIG. 15 illustrates the surface speed Vdr of the photosensitive drum 1, the surface speed Vc of the charge roller 2, and the speed difference Vc−Vdr therebetween in the section between the normal rotation and a complete stop of the drive motor 110 in a configuration where the surface speed of the charge roller 2 is lower than that of the photosensitive drum 1. The timings illustrated in FIG. 15 are the same as those in FIG. 14.

Figure 16:
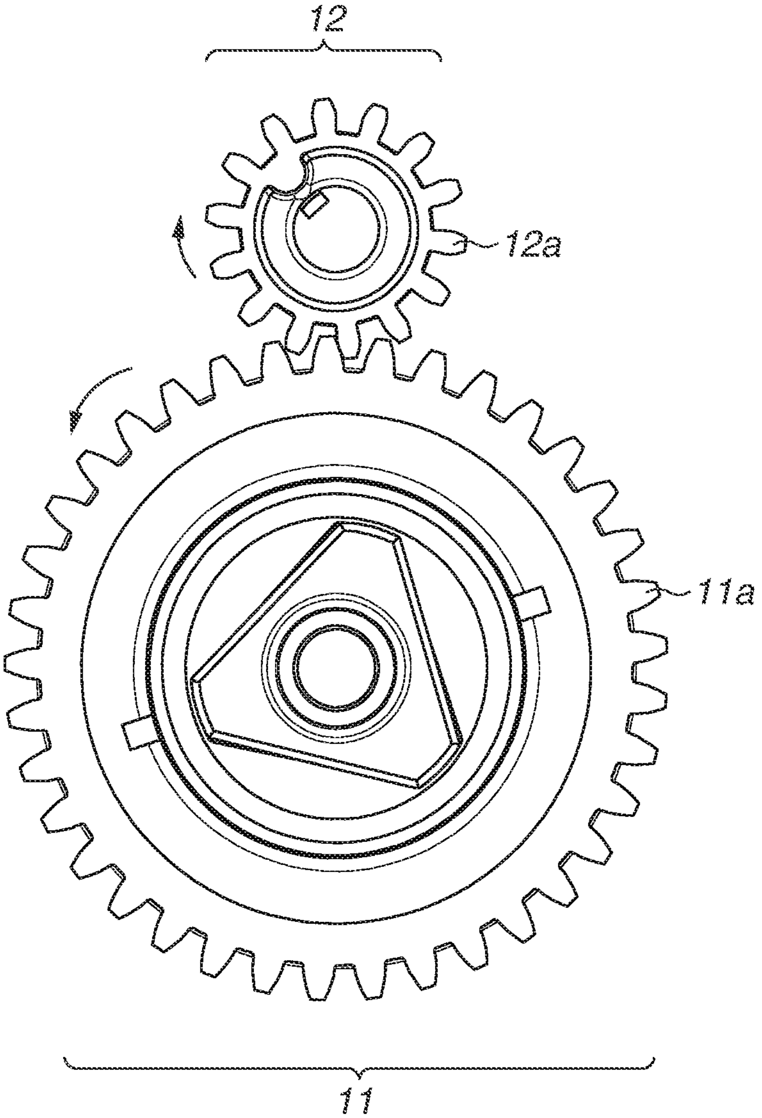
FIG. 16 is a diagram illustrating a gear drive train of the photosensitive drum and the charge roller according to the first exemplary embodiment.

Referring to FIG. 15, the section a indicates the normal rotation where the charge roller 2 and the photosensitive drum 1 rotate at constant speeds with a speed difference (Vc−Vdr) in the condition of Vc<Vdr. In this case, the gear flange 11 of the photosensitive drum 1 and the charge roller gear 12 are engaged with each other. As illustrated in FIG. 16, the tooth surfaces of the gears 11*a* of the gear flange 11 are engaged with the tooth surfaces of the gears 12*a* of the charge roller gear 12 in such a way that the tooth surfaces of the gears 12*a* push the tooth surfaces of the gears 11*a* during the rotation, contrary to the present exemplary embodiment. If the charge roller 2 rotates at a lower speed than the photosensitive drum 1, the photosensitive drum 1 receives a force in the rotational direction from the charge roller 2, and the charge roller 2 receives a reaction force in the direction opposite to the rotational direction at the charging portion a. Accordingly, the directions of the forces are opposite to those in a case where the charge roller 2 rotates at a higher speed than the photosensitive drum 1. As a result, the engagement between the gears 11 and 12 is also contrary to that in the configuration where the surface speed of the charge roller 2 is higher than that of the photosensitive drum 1.

When an instruction to stop the drive motor 110 is issued at the timing b, the rotational speed of the photosensitive drum 1 coupled with the drive motor 110 starts decelerating. In this case, since the engagement between the gears 11 and 12 is opposite to that according to the present exemplary embodiment, the rotation of the charge roller 2 decreases while maintaining the constant circumferential speed ratio with the photosensitive drum 1 determined by the gear train and then comes to a complete stop.

In the configuration where the surface speed of the charge roller 2 is lower than that of the photosensitive drum 1, since an increase in the speed difference does not occur at the time of stop, the foreign substance cleaning performance is considered to be lower than the present exemplary embodiment.

Thus, the configuration where the surface speed of the charge roller 2 is higher than that of the photosensitive drum 1 makes it easier to remove the foreign substances D1 than the configuration where the surface speed of the charge roller 2 is lower than that of the photosensitive drum 1.

Factors of the above-described difference in the foreign substance cleaning performance include, in addition to a speed variation generated between the charge roller 2 and the photosensitive drum 1, a change in the shape of the charge roller 2 in the vicinity of the charging portion a as described below.

Figure 17A:
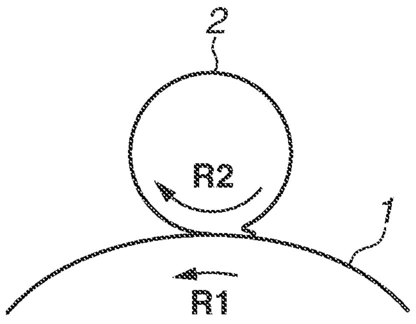
FIGS. 17A and 17B are diagrams each illustrating a deformation state of the charge roller according to the first exemplary embodiment.
Figure 17B:
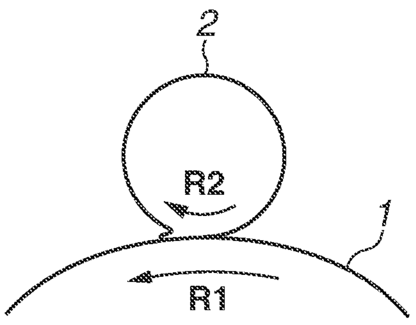

FIGS. 17A and 17B schematically illustrate a deformation of the charge roller 2 at the charging portion a in the configuration where the surface speed of the charge roller 2 is higher than that of the photosensitive drum 1 and the configuration where the former surface speed is lower than the latter surface speed, respectively. FIG. 17A schematically illustrates a deformation of the charge roller 2 in the configuration where the surface speed of the charge roller 2 is higher than that of the photosensitive drum 1. Referring to FIG. 17A, the charge roller 2 receives a force in the direction opposite to the rotational direction from the photosensitive drum 1 at the charge nip portion a, and a deformation occurs upstream of the charge nip portion a in the rotational direction of the photosensitive drum 1.

FIG. 17B schematically illustrates a deformation of the charge roller 2 in the configuration where the surface speed of the charge roller 2 is lower than the surface speed of the photosensitive drum 1. Referring to FIG. 17B, the charge roller 2 receives a force in the rotational direction from the photosensitive drum 1 at the charge nip portion a, and a deformation occurs downstream of the charge nip portion a in the rotational direction of the photosensitive drum 1. When the foreign substances D1 adhering to the charge roller 2 pass through a deformed portion f formed by the deformation, the adhesion state of the foreign substances D1 is assumed to become unstable as the surface shape of the charge roller 2 temporarily changes.

The foreign substances D1 adhering to the charge roller 2 are finally removed when the charge roller 2 and the photosensitive drum 1 rub against each other at the charge nip portion a. Accordingly, the foreign substances D1 are assumed to be more easily removed if the deformed portion f is formed immediately before the foreign substances D1 reach the charge nip portion a, i.e., the deformed portion f is formed upstream of the charge nip portion a in the rotational direction of the photosensitive drum 1.

Particularly, it is considered that, when the rotation of the photosensitive drum 1 is started and stopped, the rotation of the photosensitive drum 1 accelerates and decelerates with a speed variation and the frictional force changes greatly. As a result, the stress to the charge nip portion a is assumed to increase, and the amount of deformation of the deformed portion f is assumed to also increase, as compared to those during the normal rotation. Therefore, like the present exemplary embodiment, the performance for cleaning the foreign substances D1 is considered to be increased by performing the foreign substance cleaning control involving the stop and drive sequence.

In the above-described process of removing the foreign substances D1, the higher driving speed before a print job stops and the higher re-driving speed after the job stops provide a larger effect of the foreign substance cleaning. However, when a print job stops, the foreign substances D1 that have not been removed from the surface of the charge roller 2 may remain on the surface of the charge roller 2 in an unstable adhesion state. If the print job operation is subsequently started in this state, the foreign substances D1 may possibly be removed at the time of restarting. However, if the foreign substances D1 are not removed, the adhesion of the foreign substances D may be stabilized in the normal rotation thereafter.

Therefore, like the present exemplary embodiment, the start and stop operations where the foreign substances D1 are likely to be easily removed can be additionally performed by re-driving the stopped drive motor 110 at a high speed and then stopping the drive motor 110. This accordingly enables the foreign substances D1 in an unstable adhesion state to be effectively removed.

The present exemplary embodiment is characterized by the following features.

The image forming apparatus 100 includes the rotatable photosensitive drum 1, and the charge roller 2 that comes into contact with the photosensitive drum 1 to form the charging portion a and charges the surface of the photosensitive drum 1 at the charging portion a. The image forming apparatus 100 includes the developing roller 31 for supplying a toner to the surface of the photosensitive drum 1 charged by the charge roller 2. The image forming apparatus 100 includes the transfer roller 5 that comes into contact with the photosensitive drum 1 to form the transfer portion d and transferring the toner formed on the photosensitive drum 1 to the recording material P at the transfer portion d. The image forming apparatus 100 includes the gear flange (first gear) 11 for rotating the photosensitive drum 1, the charge roller gear (second gear) 12 for rotating the charge roller 2 and engaged with the first gear 11, and the drive motor (drive source) 110 for rotatably driving the photosensitive drum 1 and the charge roller 2 by transmitting a drive to the first gear 11. The image forming apparatus 100 includes the control unit 150 that controls the drive source and can perform the image forming operation for forming an image by rotating the photosensitive drum 1 at a first rotational speed. In a case of performing the image forming operation, the control unit 150 performs control to execute the following operation during the non-image forming operation performed after the image forming operation. The control unit 150 performs control to execute the multiple switching operation, as the foreign substance cleaning control, in which a switching operation of stopping the driven photosensitive drum 1 and re-driving the driven photosensitive drum 1 at a second rotational speed higher than a first rotational speed is repeated a plurality of times.

In the image forming operation, when the image forming mode in which the photosensitive drum 1 is rotated at the first rotational speed is referred to as a first image forming mode, a second image forming mode in which the photosensitive drum 1 is rotated at the second rotational speed to perform image formation can be also controlled. The second image forming mode is a regular mode normally performed, and the first image forming mode is a low-speed mode different from the regular mode. If a series of the image forming operations is defined to include a first image forming operation, a second image forming operation performed after the first image forming operation, and a non-image forming operation performed between the first and the second image forming operations, the following control is performed in the present exemplary embodiment. In a case of performing the series of the image forming operations, the control unit 150 performs control to execute the multiple switching operation in which a switching operation of stopping the driven photosensitive drum 1 and re-driving the photosensitive drum 1 at the second rotational speed higher than the first rotational speed is repeated a plurality of times during execution of the non-image forming operation. In a case of performing the image forming operation, the control unit 150 drives the photosensitive drum 1 at the second rotational speed, stops the photosensitive drum 1, and then re-drive the photosensitive drum 1 at the second rotational speed during execution of the non-image forming operation performed after the image forming operation. In a case of performing the series of the image forming operations, the control unit 150 may stop the driven photosensitive drum 1 and then re-drive the photosensitive drum 1 at a third rotational speed higher than the first rotational speed during execution of the non-image forming operation. The control unit 150 may stop the photosensitive drum 1 in a state of being driven at the third rotational speed and then re-drive the photosensitive drum 1 at the third rotational speed during execution of the non-image forming operation. The third rotational speed may be the same as the second rotational speed. The third rotational speed may be further higher than the highest driving speed among the driving speeds of the drive motor 110 controlled during the image forming operation. When rotating the photosensitive drum 1, the surface speed of the charge roller 2 is configured to be higher than the surface speed of the photosensitive drum 1. During the switching operation, when the control unit 150 stops the photosensitive drum 1 in a state of being driven and then re-drives the photosensitive drum 1, the control unit 150 performs control to increase the speed of the photosensitive drum 1 so as to be in the steady state.

Although, in the exemplary embodiment, the image forming apparatus 100 includes the photosensitive drum 1, the development apparatus 3, and the charge roller 2, they may be configured in the form of a process cartridge. More specifically, the photosensitive drum 1, the development apparatus 3, and the charge roller 2 may be configured as a process cartridge that can be attached to and detached from the image forming apparatus 100. The photosensitive drum 1 and the charge roller 2 may be configured as a drum cartridge, and the development apparatus 3 may be configured as a developing cartridge. In this case, both the drum cartridge and the developing cartridge may be attachable to and detachable from the image forming apparatus 100, or either one of the cartridges may be attachable to and detachable from the image forming apparatus 100.

A second exemplary embodiment of the present disclosure will be described below. Basic configurations and operations of the image forming apparatus 100 according to the present exemplary embodiment are the same as those of the image forming apparatus 100 according to the first exemplary embodiment. Therefore, in the image forming apparatus 100 according to the present exemplary embodiment, elements having the same or equivalent functions or configurations as those of the image forming apparatus 100 according to the first exemplary embodiment are assigned the same reference numerals as those of the image forming apparatus 100 according to the first exemplary embodiment, and detailed descriptions thereof will be omitted.

1. Cleaning Control in the Present Exemplary Embodiment

The first exemplary embodiment has been described above centering on a case where the sheet counter N is overwritten after the opening and closing of the rear door 14. The present exemplary embodiment will be described below centering on an adding method for the sheet counter N.

Figure 18A:
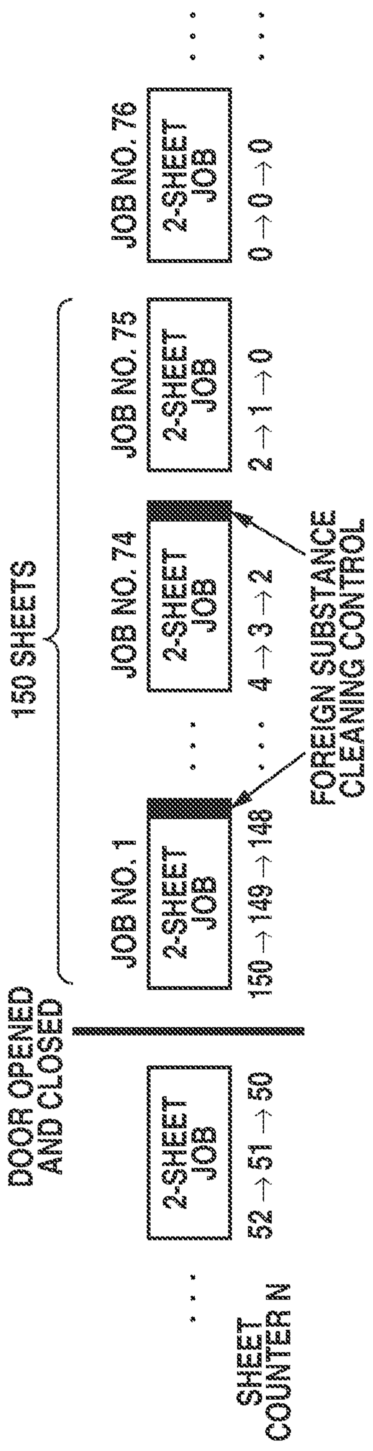
FIGS. 18A to 18C are diagrams each illustrating foreign substance cleaning control after opening and closing of a door according to a second exemplary embodiment.

Control according to the present exemplary embodiment will be described below with reference to FIGS. 18A and 18B. To simplify description, all jobs are assumed to be 2-sheet jobs like the first exemplary embodiment.

According to the present exemplary embodiment, after the rear door 14 is opened and closed and the door sensor S1 detects the opening and closing of the rear door 14, a predetermined value 100 is added to the sheet counter N.

Figure 12A:
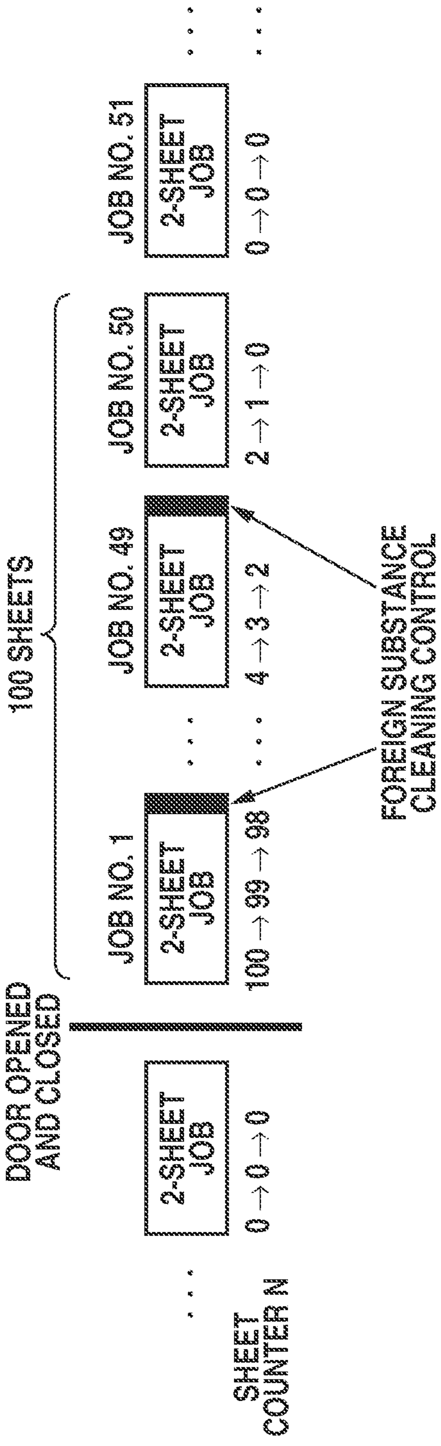
FIGS. 12A and 12B are diagrams each illustrating the foreign substance cleaning control after opening and closing of the door according to the first exemplary embodiment.
Figure 12B:
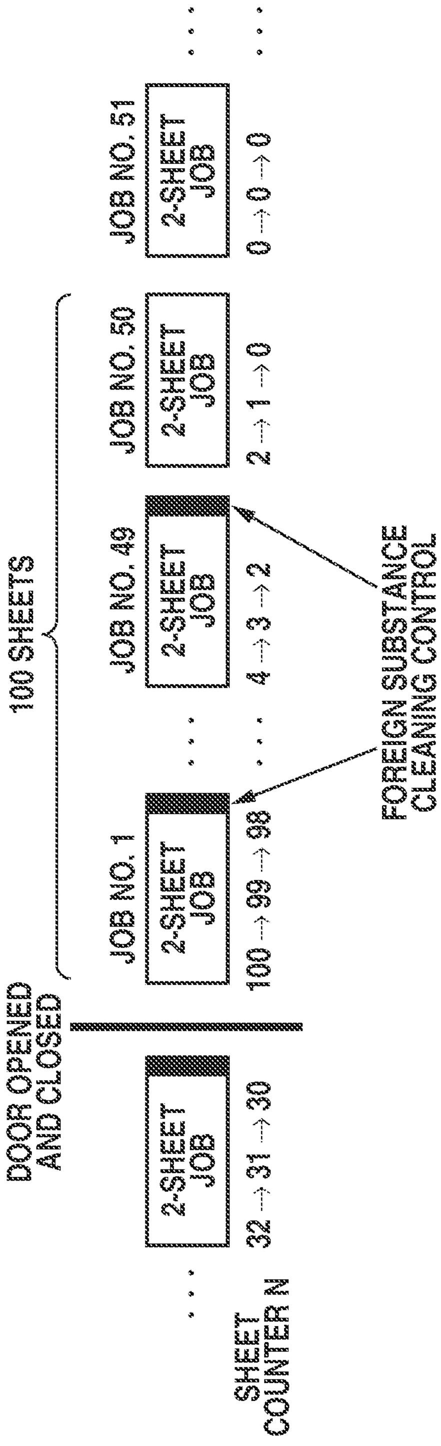

When the sheet counter N before the opening and closing of the rear door 14 is 0, the sheet counter N becomes 100 (N=0+100) after the opening and closing of the rear door 14, and the same operation as that in FIG. 12A is performed. A case where the sheet counter N before the opening and closing of the rear door 14 is larger than 0 (N>0) will be described below with reference to FIGS. 18A and 18B. FIG. 18A illustrates control when the opening and closing of the rear door 14 is performed when N is 50 (N=50>0). In this case, the sheet counter N is set to 150 (N=50+100) after the rear door 14 is opened and closed. When the sheet counter is 50, it assumes a state where about a half of the amount of the foreign substances D1 remains immediately after the foreign substances D1 fall on the photosensitive drum 1 and the charge roller 2, and then more foreign substances D1 will additionally fall by the opening and closing of the rear door 14.

The amount of addition may be changed according to the value of the sheet counter N before the opening and closing of the rear door 14. For example, if all of the foreign substances D1 fall on the double-sided conveyance guide 13 when the rear door 14 is last opened and closed, the amount of addition may be changed according to the estimated amount of the foreign substances D1 to be accumulated on the double-sided conveyance guide 13.

Figure 18B:
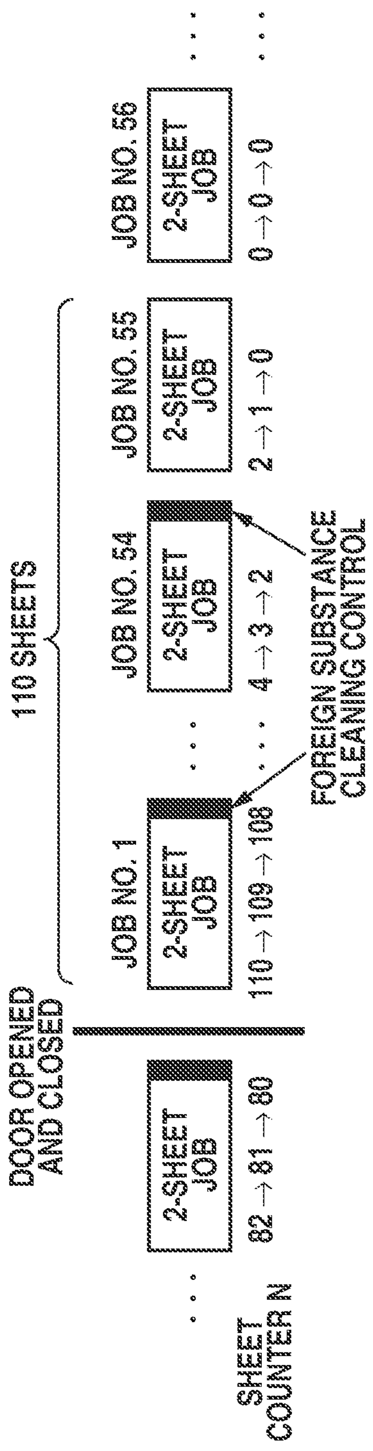
Figure 18C:
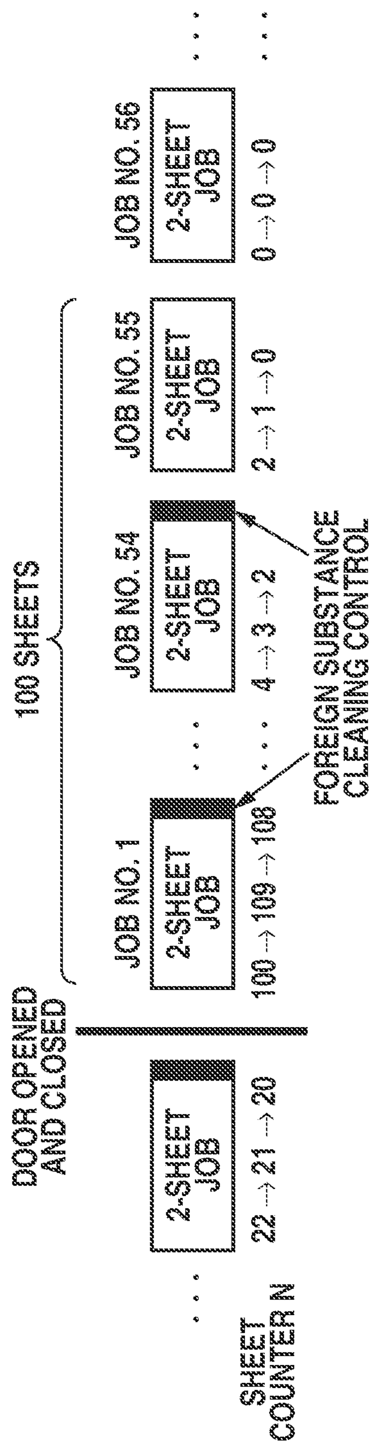

When the sheet counter N before the opening and closing of the rear door 14 is 80 (N=80), as illustrated in FIGS. 18B and 18C, the amount of addition may be set to 30 after the opening and closing of the rear door 14, and when the sheet counter N is 20 (N=20), the amount of addition may be set to 80.

Not only the additional foreign substances D1 accumulated on the double-sided conveyance guide 13 but also the foreign substances D1 remaining on the double-sided conveyance guide 13 and the foreign substances D1 remaining on the photosensitive drum 1 and the charge roller 2 depend on the configuration and operating environment of the image forming apparatus 100. Therefore, it is desirable that the addition method is suitably changed according to conditions.

With the addition method, when the rear door 14 is frequently opened and closed, the foreign substance cleaning control is to be continuously performed, thereby possibly resulting in the degradation of fogging images. Therefore, a predetermined upper limit value is set, and the sheet counter N is controlled to not exceed the predetermined upper limit value.

The description of the calculation of the overwrite value for the sheet counter N according to the first exemplary embodiment also applies to the amount of addition according to the present exemplary embodiment. For example, the amount of addition may be determined based not on the number of sheets but on the running distance, or the amount of addition may be changed according to the varying performance for cleaning the foreign substances D1 according to the durability characteristics of the members. In addition, a value obtained by multiplying a constant as the base of the calculation by a coefficient may be added to overwrite the counter, instead of adding the constant.

As described above, black spot images and fogging images can be prevented by using the above-described sheet counter addition method that considers the varying amount of the foreign substances D1 in the image forming apparatus 100.

A third exemplary embodiment of the present disclosure will be described below. Basic configurations and operations of the image forming apparatus 100 according to the present exemplary embodiment are the same as those of the image forming apparatus 100 according to the first exemplary embodiment. Therefore, in the image forming apparatus 100 according to the present exemplary embodiment, elements having the same or equivalent functions or configurations as those of the image forming apparatus 100 according to the first exemplary embodiment are assigned the same reference numerals as those of the image forming apparatus 100 according to the first exemplary embodiment, and detailed descriptions thereof will be omitted.

1. Foreign Substance Cleaning Control in the Present Exemplary Embodiment

To make it easier to understand the control according to the present exemplary embodiment, the issue of the present exemplary embodiment will be described in detail below. The effect of the foreign substance cleaning control using the sheet counter N has been described in the first exemplary embodiment. In a case where a user prints a large number of sheets at a time, if the foreign substance cleaning control is stopped when 100 sheets are printed, the number of times of the foreign substance cleaning control is not sufficient, possibly resulting in insufficient cleaning performance. In a case of using the job counter, the foreign substance cleaning control is performed a predetermined number of times. However, in a case where a user prints a large number of sheets at a time, the running distance of the charge roller 2 increases until the job counter reaches the predetermined number of times. Therefore, the foreign substances D1 adhering to the charge roller 2 during the period cannot be easily removed, possibly reducing the effect of the foreign substance cleaning control.

To address the issue, the present exemplary embodiment is characterized by including an execution counter L for the foreign substance cleaning control to control the number of times of the foreign substance cleaning control according to the number of sheets of a job and determining the number of times of the foreign substance cleaning control per a unit number of sheets. For example, the control unit 150 performs control to execute the foreign substance cleaning control 50 times per 100 sheets. The execution counter L is stored in the non-volatile memory 152.

Figure 19:
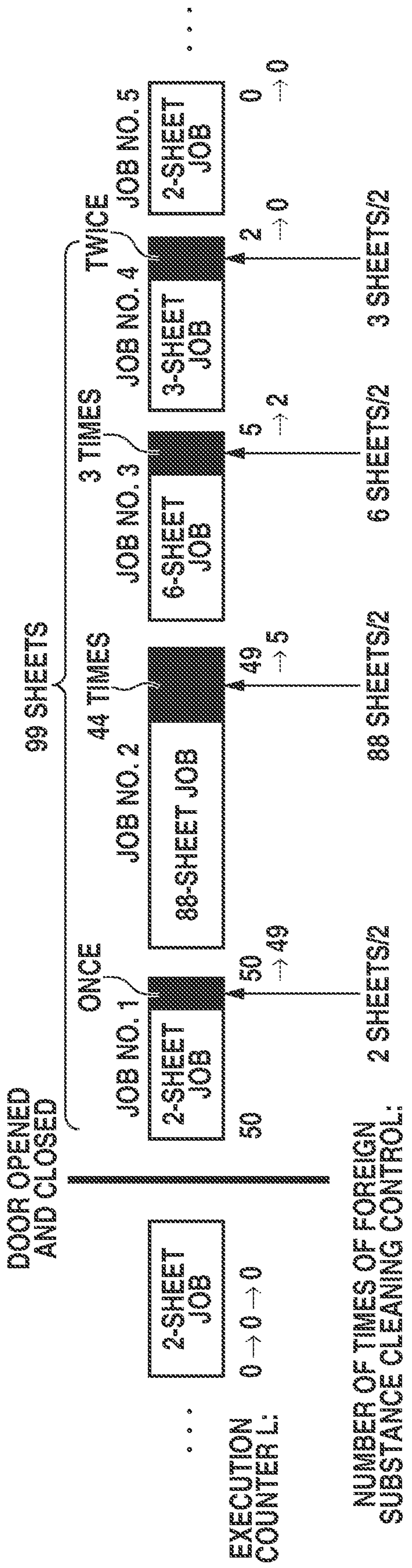
FIG. 19 is a diagram illustrating the foreign substance cleaning control after opening and closing of the door according to the second exemplary embodiment.

The control according to the present exemplary embodiment will be described below with reference to FIG. 19. As illustrated in FIG. 19, according to the present exemplary embodiment, the execution counter L is overwritten with 50 upon detection of the opening and closing of the rear door 14. Then, when a job is started, the control unit 150 performs the foreign substance cleaning control (number of sheets of a job/2) times after the post-rotation processing in the job and at the same time, the execution counter L is decremented by (number of sheets of a job/2). The value of the dominator is 2 which is obtained by dividing the number of sheets (100) for the foreign substance cleaning control after the opening and closing of the rear door 14 by the number of times of the control (50). This value is determined by the number of times of the control to be performed before the number of sheets reaches a certain number of sheets after the opening and closing of the rear door 14. If the number of times of the control is a decimal number, the number is rounded off, and a rounded up number or a rounded down number may be used for the calculation. FIG. 19 illustrates an example where a 2-sheet job, 88-sheet job, 6-sheet job, 3-sheet job, and 2-sheet job are executed in this order after the opening and closing of the rear door 14. In this case, the control unit 150 performs the foreign substance cleaning control once, 44 times, 3 times, twice, and 0 time, a total of 50 times for up to the 3-sheet job. The control unit 150 does not perform the control after the 2-sheet job since the execution counter L is 0.

The above-described control will be summarized as follows. If an execution counter overwrite value is denoted as M1, a sheet counter is denoted as M2, a sheet counter overwrite value is denoted as L1, and an execution counter is denoted as L2, these values are stored in the memory 152 as constants and variables. M1 and L1 are constants, and the above-described denominator (2) is calculated by M1/L1. M2 and L2 are variables, and L2 is overwritten by L1 after the opening and closing of the door and then counted down according to the number of sheets of the job.

M1 and L1 do not need to be unique values and may be changed depending on the configuration and operating conditions of the image forming apparatus 100 or the durability conditions such as the cumulative number of fed sheets.

Although, in the present exemplary embodiment, the foreign substance cleaning control is collectively performed after completion of the post-rotation process after completion of all jobs. However, the foreign substance cleaning control may be performed once during execution of each job at an average execution frequency M1/L1 for the foreign substance cleaning control.

The above-described control enables the foreign substance cleaning to be performed a suitable number of times to remove the foreign substances D1, and at the same time, can prevent the degradation of the cleaning performance with an increase in the running distance.

Figure 20:
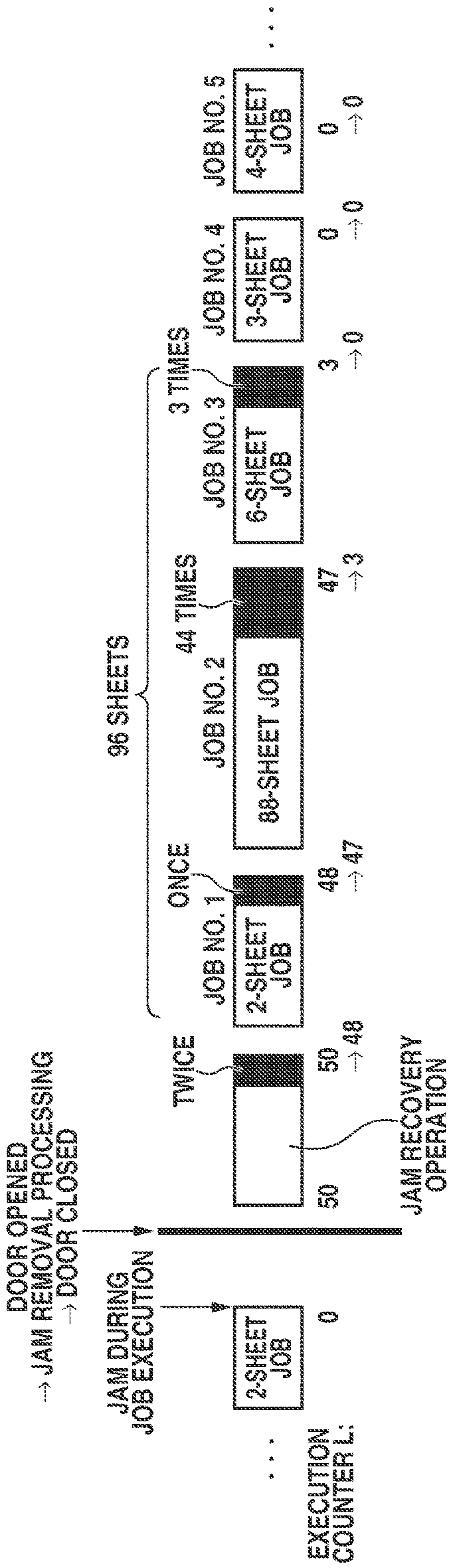
FIG. 20 is a diagram illustrating the foreign substance cleaning control after opening and closing of the door according to the second exemplary embodiment.

In a case of performing a jam recovery operation after the opening and closing of the rear door 14, as illustrated in FIG. 20, the control unit 150 may perform the foreign substance cleaning control along with the jam recovery operation. This is because, by removing from the charge roller 2 the foreign substances D1 fallen thereon immediately after the opening and closing of the rear door 14, the foreign substances D1 can be prevented from becoming hard to be removed. Further, performing the foreign substance cleaning control ahead of time enables reductions in the number of sheets and the number of times of the foreign substance cleaning control to be performed after the post-rotation process of the job. An effect of reducing the downtime can also be expected. FIG. 20 illustrates an example where the foreign substance cleaning control is performed after the jam recovery operation after the opening and closing of the rear door 14, and the number of sheets for the subsequent foreign substance cleaning control is reduced. Although, in this case, the number of times of the foreign substance cleaning is also set to 50, the number may be further reduced. Although, in the example in FIG. 20, the number of times of the foreign substance cleaning control after the jam recovery operation is twice, a similar effect can be obtained even if the control is performed once. It is expected that the effect is enhanced with increasing number of times of the control. Although, in the example in FIG. 20, the foreign substance cleaning control is performed after the jam recovery operation, the foreign substance cleaning control may be performed at the beginning of the jam recovery operation or during the jam recovery operation.

If a jam occurs during job execution, the post-rotation process is not performed, and the user opens and closes the rear door 14 for the jam removal processing. Therefore, it is also assumed that the foreign substance cleaning control to be performed in the job in which the jam has occurred is not performed. Therefore, the required foreign substance cleaning control can be controlled to be performed by performing the above-described control. According to the exemplary embodiment, as illustrated in FIG. 20, the control unit 150 performs the foreign substance cleaning control in the jam recovery operation as a pre-rotation operation performed before the image forming operation, and also performs the foreign substance cleaning control after the image forming operation. The number of times of the foreign substance cleaning control in the jam recovery operation may be larger or smaller than the number of times of the foreign substance cleaning control after the post-rotation process for the subsequent job. In the condition where the amount of the foreign substances D1 is large, the number of times of the foreign substance cleaning control in the jam recovery operation may be set to a larger number. If the operation is to be switched to the printing operation ahead of time, the number of times of the foreign substance cleaning control in the jam recovery operation may be set to a smaller number.

For example, the adhesion of the foreign substances D1 to the charge roller 2 is assumed to change depending on the temperature and humidity. In such a case, an environmental sensor (temperature-humidity sensor) (not illustrated) may be provided in the image forming apparatus 100, and the control may be changed according to the temperature and humidity detected by the temperature-humidity sensor. More specifically, the number of times of the foreign substance cleaning control may be increased upon detecting the environment where the foreign substances D1 are not easily removable.

By controlling the number of times of the foreign substance cleaning control in the lifetime of the image forming apparatus 100 according to the specifications of the image forming apparatus 100 and the characteristics of the members, interruptions and influences on the lifetime can be minimized while preventing the occurrence of black spots.

As described above, the present disclosure makes it possible to prevent an image defect caused by foreign substances adhering to a photosensitive drum.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-027944, filed Feb. 27, 2023, which is hereby incorporated by reference herein in its entirety.

What is claimed is:

1. An image forming apparatus capable of performing an image forming operation for forming an image on a transfer material, the image forming apparatus comprising:

a photosensitive drum that is rotatable;

a charging member configured to come into contact with the photosensitive drum to form a charging portion and charge a surface of the photosensitive drum at the charging portion;

a developing member configured to supply a toner to the surface of the photosensitive drum charged by the charging member;

a transfer member configured to come into contact with the photosensitive drum to form a transfer portion and transfer the toner formed on the photosensitive drum to the transfer material at the transfer portion;

a moving member configured to move between an open position where an inside of the image forming apparatus is exposed and a shielding position where the inside of the image forming apparatus is shielded;

a detection unit configured to detect information about a first movement in which the moving member moves from the open position to the shielding position or a second movement in which the moving member moves from the shielding position to the open position;

a drive source configured to rotatably drive the photosensitive drum; and a control unit configured to control the drive source, wherein, during execution of a non-image forming operation different from the image forming operation, the control unit performs control to execute a multiple switching operation for performing a switching operation a plurality of times, wherein the switching operation is an operation in which the control unit stops the photosensitive drum in a state of being driven and then rotatably re-drives the photosensitive drum, and wherein, in a case where the detection unit detects the information about the first movement or the second movement, the control unit performs control to execute the multiple switching operation.

2. The image forming apparatus according to claim 1, wherein, in the case where the detection unit detects the information about the first movement or the second movement, the control unit performs control to execute the multiple switching operation in the non-image forming operation performed after the image forming operation.

3. The image forming apparatus according to claim 1, wherein, in the case where the detection unit detects the information about the first movement or the second movement, the control unit performs control to execute the multiple switching operation in the non-image forming operation performed before the image forming operation.

4. The image forming apparatus according to claim 1, further comprising a counting unit configured to count information about a number of recording materials with images formed on the recording materials by the image forming operation, wherein the control unit performs control to execute the multiple switching operation based on the information about the number of recording materials counted by the counting unit.

5. The image forming apparatus according to claim 4, wherein the information about the number of recording materials is a number of printed recording materials, and wherein the control unit performs control to execute the multiple switching operation until the number of printed recording materials exceeds a predetermined number of sheets.

6. The image forming apparatus according to claim 5, wherein the control unit counts down the number of printed recording materials from the predetermined number of sheets and performs control to execute the multiple switching operation until the number of printed recording materials becomes zero.

7. The image forming apparatus according to claim 4, wherein the information about the number of recording materials is a number of jobs of recording materials, and wherein the control unit performs control to execute the multiple switching operation until the number of jobs of recording materials exceeds a predetermined number of jobs.

8. The image forming apparatus according to claim 7, wherein the control unit counts down the number of jobs of recording materials from the predetermined number of jobs and performs control to execute the multiple switching operation until the number of jobs of recording materials becomes zero.

9. The image forming apparatus according to claim 4, further comprising a first memory configured to store a first threshold value related to the number of recording materials with images formed on the recording materials, wherein the control unit performs control to execute the multiple switching operation based on the information about the number of recording materials counted by the counting unit and the first threshold value.

10. The image forming apparatus according to claim 9, wherein the information about the number of recording materials is a number of printed recording materials, and the first threshold value is a threshold value of the number of printed recording materials, and wherein the control unit performs control to execute the multiple switching operation until the number of printed recording materials exceeds the threshold value of the number of printed recording materials.

11. The image forming apparatus according to claim 9, wherein the information about the number of recording materials is a number of jobs of recording materials, and the first threshold value is a threshold value of the number of jobs of recording materials, and wherein the control unit performs control to execute the multiple switching operation until the number of jobs of recording materials exceeds the threshold value of the number of jobs of recording materials.

12. The image forming apparatus according to claim 9, wherein the first memory is configured to store a second threshold value related to a number of times of the multiple switching operation, and wherein the control unit performs control to execute the multiple switching operation based on the second threshold value.

13. The image forming apparatus according to claim 1, wherein the image forming apparatus is provided with a first opening and a second opening, and wherein, when viewed from a direction perpendicular to a rotational axis direction of the photosensitive drum, a double-sided conveyance guide for conveying a recording material in double-sided printing is disposed between the first opening and the second opening.

14. The image forming apparatus according to claim 13, wherein the double-sided conveyance guide is disposed in a vicinity of the moving member.

15. The image forming apparatus according to claim 1, wherein the image forming apparatus is provided with a first opening and a second opening, and wherein, when viewed from a direction perpendicular to a rotational axis direction of the photosensitive drum, the photosensitive drum is disposed between the first opening and the second opening.

16. The image forming apparatus according to claim 15, wherein the first opening is an air hole for exhausting air in a side of the image forming apparatus to an outside of the image forming apparatus, and wherein the second opening is a discharge port for discharging a recording material with an image formed on the recording material by the image forming operation from the inside of the image forming apparatus to the outside of the image forming apparatus.

17. The image forming apparatus according to claim 15, wherein the first opening is disposed on the moving member.

18. The image forming apparatus according to claim 1, further comprising a tray configured to store recording materials in a stacked manner, wherein, in a direction perpendicular to a rotational axis direction of the photosensitive drum, the moving member is disposed on a surface opposite to a surface where the tray is disposed.

19. The image forming apparatus according to claim 1, wherein the drive source includes a first gear configured to rotate the photosensitive drum, and a second gear configured to rotate the charging member, and wherein the drive source is configured to transmit a drive to the second gear engaging with the first gear and the first gear to rotatably drive the photosensitive drum and the charging member.

20. The image forming apparatus according to claim 1, wherein the switching operation is a first switching operation, wherein, in controlling the drive source, the control unit performs control such that the photosensitive drum rotates at a first rotational speed to perform image forming, wherein the control unit performs control to execute the multiple switching operation for performing a second switching operation a plurality of times during execution of the non-image forming operation, and wherein the second switching operation is an operation in which the control unit stops the photosensitive drum in the state of being driven and then rotatably re-drives the photosensitive drum at a second rotational speed higher than the first rotational speed.

21. The image forming apparatus according to claim 20, wherein, in the image forming operation, if an image forming mode for rotating the photosensitive drum at the first rotational speed is a first image forming mode, the control unit is able to control a second image forming mode for forming an image by rotating the photosensitive drum at the second rotational speed.

22. The image forming apparatus according to claim 21, wherein the second image forming mode is a regular mode that is normally executed, and the first image forming mode is a low-speed mode different from the regular mode.

23. The image forming apparatus according to claim 20, wherein the non-image forming operation is a first non-image forming operation, wherein a series of image forming operations is defined to include a first image forming operation, a second image forming operation performed after the first image forming operation, and a second non-image forming operation performed between the first image forming operation and the second image forming operation, wherein, in a case of performing the series of image forming operations, the control unit performs control to execute a third switching operation a plurality of times during execution of the second non-image forming operation, and wherein the third switching operation is an operation in which the control unit stops the photosensitive drum in the state of being driven and then rotatably re-drives the photosensitive drum at a third rotational speed higher than the first rotational speed.

24. The image forming apparatus according to claim 23, wherein the third rotational speed is same as the second rotational speed.

25. The image forming apparatus according to claim 23, wherein the third rotational speed is further higher than a highest driving speed among driving speeds of the drive source controlled during the image forming operation.

26. The image forming apparatus according to claim 1, wherein, when the photosensitive drum is rotated, a surface speed of the charging member is higher than a surface speed of the photosensitive drum.

27. The image forming apparatus according to claim 1, wherein, in the switching operation, the control unit performs control to drive the photosensitive drum, stop the photosensitive drum, and re-drive the photosensitive drum so as to increase a speed of the photosensitive drum up to a steady state.

28. The image forming apparatus according to claim 1, wherein the toner is a one-component developer.

29. The image forming apparatus according to claim 1, further comprising a brush having a density of 150 $kF/inch^2$ or higher and configured to come into contact with the surface of the photosensitive drum downstream of the transfer member and upstream of the charging member in a rotational axis direction of the photosensitive drum.

30. An image forming apparatus capable of performing an image forming operation for forming an image on a transfer material, the image forming apparatus comprising:

a photosensitive drum that is rotatable;

a charging member configured to come into contact with the photosensitive drum to form a charging portion and charge a surface of the photosensitive drum at the charging portion;

a developing member configured to supply a toner to the surface of the photosensitive drum charged by the charging member;

a transfer member configured to come into contact with the photosensitive drum to form a transfer portion and transfer the toner formed on the photosensitive drum to the transfer material at the transfer portion;

a drive source configured to rotatably drive the photosensitive drum; and a holding member configured to hold an inlet for supplying power to the image forming apparatus; and a control unit configured to detect a first state where the inlet is held by the holding member and a second state where the inlet is unplugged from the holding member, and control the drive source, wherein, during execution of a non-image forming operation different from the image forming operation, the control unit performs control to execute a multiple switching operation for performing a switching operation a plurality of times, wherein the switching operation is an operation in which the control unit stops the photosensitive drum in a state of being driven and then rotatably re-drives the photosensitive drum, and wherein, upon detection of a change from the second state to the first state, the control unit performs control to execute the multiple switching operation.

31. The image forming apparatus according to claim 30, wherein the toner is a one-component developer.

32. The image forming apparatus according to claim 30, further comprising a brush having a density of 150 $kF/inch^2$ or higher and configured to come into contact with the surface of the photosensitive drum downstream of the transfer member and upstream of the charging member in a rotational axis direction of the photosensitive drum.

* * * * *